United States Patent [19]

Sato et al.

[11] Patent Number: 5,542,037
[45] Date of Patent: Jul. 30, 1996

[54] IMAGE DISPLAYING APPARATUS WHEREIN SELECTED STORED IMAGE DATA IS COMBINED AND THE COMBINED IMAGE DATA IS DISPLAYED

[75] Inventors: Shinichiro Sato; Yukio Naruki, both of Fussa; Hiroyuki Yoshino, Higashiyamato; Susumu Onodera, Ome, all of Japan

[73] Assignee: Casio Computer Co., Ltd., Tokyo, Japan

[21] Appl. No.: 109,738

[22] Filed: Aug. 20, 1993

[30] Foreign Application Priority Data

Aug. 24, 1992 [JP] Japan .................................. 4-224237
Dec. 21, 1992 [JP] Japan .................................. 4-340300
Dec. 28, 1992 [JP] Japan .................................. 4-361236

[51] Int. Cl.$^6$ ................................................ G06T 11/00
[52] U.S. Cl. ...................... 395/133; 395/135; 395/141; 395/155; 395/161
[58] Field of Search ........................... 395/133–139, 395/141, 145, 147, 152, 155–161; 382/2

[56] References Cited

U.S. PATENT DOCUMENTS 4,841,575 6/1989 Welsh et al. .......................... 392/2 X
5,057,019 10/1991 Harvey .................................. 434/155
5,280,570 1/1994 Jordan .................................. 395/135
5,289,568 2/1994 Hosoya et al. ....................... 395/135

FOREIGN PATENT DOCUMENTS 0275124 7/1988 European Pat. Off. .
1546072 5/1979 United Kingdom .

Primary Examiner—Almis R. Jankus
Attorney, Agent, or Firm—Frishauf, Holtz, Goodman, Langer & Chick

[57] ABSTRACT

An image displaying apparatus, in which a plurality of image data of parts are stored in a ROM (read only memory) which parts are representative of elements of a portrait such as eyes, eyebrows, a nose, hair, an outline of a face and so on, image data of the parts selected by operation of a key input unit are read out from the ROM and are combined on a display unit of a dot matrix type, whereby a desired portrait is displayed thereon. A display position on the display unit where each of the image data combined into the above desired portrait is to be displayed is previously determined. The display position can be changed by operation of up/down keys or left/right keys provided in the key input unit. Using these keys, a wide variety of portraits which are rich in expression may be composed.

8 Claims, 22 Drawing Sheets

| | | |
|---|---|---|
| Z=2 | 👁 | NORMAL |
| Z=1 | 👁 | ↑ EXTENDED UPWARDS |
| Z=3 | 👁 | ↓ EXTENDED DOWNWARDS |
| Z=0 | 👁 | ← EXTENDED LEFTWARDS |
| Z=4 | 👁 | → EXTENDED RIGHTWARDS |

A-11　　　A-12　　　A-13　　　A-14

A-21　　　A-22　　　(A-23)　　　A-24

A-31　　　A-32　　　A-33　　　A-34

A-41　　　A-42　　　A-43　　　A-44

| B-11 | B-12 | B-13 | B-14 |
|---|---|---|---|
|  |  |  |  |// 
| B-21 | B-22 | (B-23) | B-24 |
|  |  |  |  |
| B-31 | B-32 | (B-33) | B-34 |
|  |  |  |  |
| B-41 | B-42 | B-43 | B-44 |
|  |  |  |  |

C-11   C-12   C-13   C-14

C-21   C-22   (C-23)   C-24

C-31   C-32   C-33   C-34

C-41   C-42   C-43   C-44

IMAGE DISPLAYING APPARATUS WHEREIN SELECTED STORED IMAGE DATA IS COMBINED AND THE COMBINED IMAGE DATA IS DISPLAYED

BACKGROUND OF THE INVENTION

1. Field of the Invention

The present invention relates to an image displaying apparatus in which a number of image data are previously stored in a memory unit, and arbitrary image data are selected from among the image data stored in the memory unit to be combined, and a combined data is displayed.

2. Description of the Related Art

Conventionally, a montage composing apparatus has been known which combines image data each representative of a portion of a human face such as eyes, a nose, a mouth, a hair style, an outline of a face and so on to compose a portrait of a person, and displays the composed portrait of the person.

The montage composing apparatus of this type is provided with a part memory unit in which parts representing portions of a human face such as eyes, a nose, a mouth, eye brows, a face outline and so on are stored, which parts are each comprised of plural sorts of part patterns of a different bit map format. In the montage composing apparatus, a part pattern of each of the parts is selectively read out from the memory unit by key input operations, the read out part patterns are combined to compose the portrait of the person, and the composed portrait of the person is displayed.

A memory position on a bit map in the part memory unit at which the part patterns of a part are stored is previously determined in accordance with a standard position for each of the parts such as the eyes, nose, mouth and so on. Therefore, even though various part patterns of a part should be selected, these selected part patterns are always displayed at the previously determined positions on a portrait. If the part patterns of the part should be displayed at different positions, part patterns of various parts can be displayed in an overlapped manner. To prevent the part patterns from being displayed in the overlapped manner, the display positions at which the part patterns of the parts are to be displayed are previously determined.

Therefore, even though a part pattern of an eye part which resembles what a user of the apparatus wants is selected, the part pattern of the eye part is always displayed at the previously determined position on the portrait but not at an arbitrary position, as described above. Accordingly, the composed portrait gives a different impression from what the user wanted, even though the individual part pattern of the part resembles what the user wanted.

SUMMARY OF THE INVENTION

The present invention has been made to overcome the above mentioned drawbacks of the prior art. One object of the present invention is to provide an image displaying apparatus which comprises:

image-data storing means for storing a plurality of different image data of each of parts composing an object;

image-data selecting means for selecting an image data of each of the parts from among the plurality of image data stored in said image-data storing means;

image composing means for combining the image data selected by said image-data selecting means to compose an image of the object;

image-data displaying means for displaying the image of the object composed by said image composing means; and display controlling means for moving, independently of the other image data, at least one of the image data combined into the image of the object on said image-data displaying means.

With the above mentioned structure of the image displaying apparatus of the present invention, an image which is very similar to a real object can be composed using a small number of part pattern data stored in a memory unit of the apparatus.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which:

FIG. 1 is a circuit diagram of an image displaying apparatus of the present invention;

FIG. 2 is a view showing a display area of a display unit;

FIG. 3 is a view showing a stored state of data in the image display apparatus;

FIG. 4 is a flow chart of a montage composing process in the image display apparatus;

FIG. 5 is a flow chart of a part pattern moving process included in the montage composing process in the image displaying apparatus;

FIGS. 6A to 6E are views each illustrating an indication of portrait data displayed during the montage composing process and the part pattern moving process;

FIG. 7 is a circuit diagram of the second embodiment of the present invention;

FIG. 8 is a flow chart of a montage composing process in the second embodiment;

FIG. 9 is a flow chart of a part pattern extending process included in the montage composing process in the second embodiment;

FIG. 10 is a view illustrating extended states of a part pattern processed during the part pattern extending process;

FIGS. 11 to 25A, 25B are views for illustrating a third embodiment of the present invention;

FIG. 11 is an external view of an electronic apparatus according to the third embodiment of the present invention;

FIG. 12 is a circuit diagram of the electronic apparatus;

FIG. 13 is a view showing a storing state of various part patterns of an outline part of a strong or square-jawed face which are stored in a part pattern ROM of the electronic apparatus;

FIG. 14 is a view showing a storing state of various part patterns of an outline part of a face having a round jaw stored in the part pattern ROM of the electronic apparatus;

FIG. 15 is a view showing a storing state of various part patterns of an outline part of a face having a hatchet jaw stored in the part pattern ROM of the electronic apparatus;

FIG. 16 is a flow chart of a montage composing process of the third embodiment;

FIG. 17 is a flow chart of a data combining process executed during the montage composing process;

FIG. 18 is a flow chart showing the first half portion of an outline selecting process executed during the montage composing process;

FIG. 19 is a flow chart showing the second half portion of the outline selecting process executed during the montage composing process;

FIG. 20 is a flow chart of a complementing process executed during the outline selecting process;

FIG. 24 is a view showing a complemented part pattern obtained during an outline selecting/complementing process; and FIGS. 25A and 25B are views that show respectively an original part pattern and a part pattern which has been subjected to a pattern changing process when a similar part pattern is not available.

DETAILED DESCRIPTION OF THE PREFERRED EMBODIMENTS

First Embodiment

Now, a first embodiment of the present invention will be described with reference the accompanying drawings.

Figure 1:
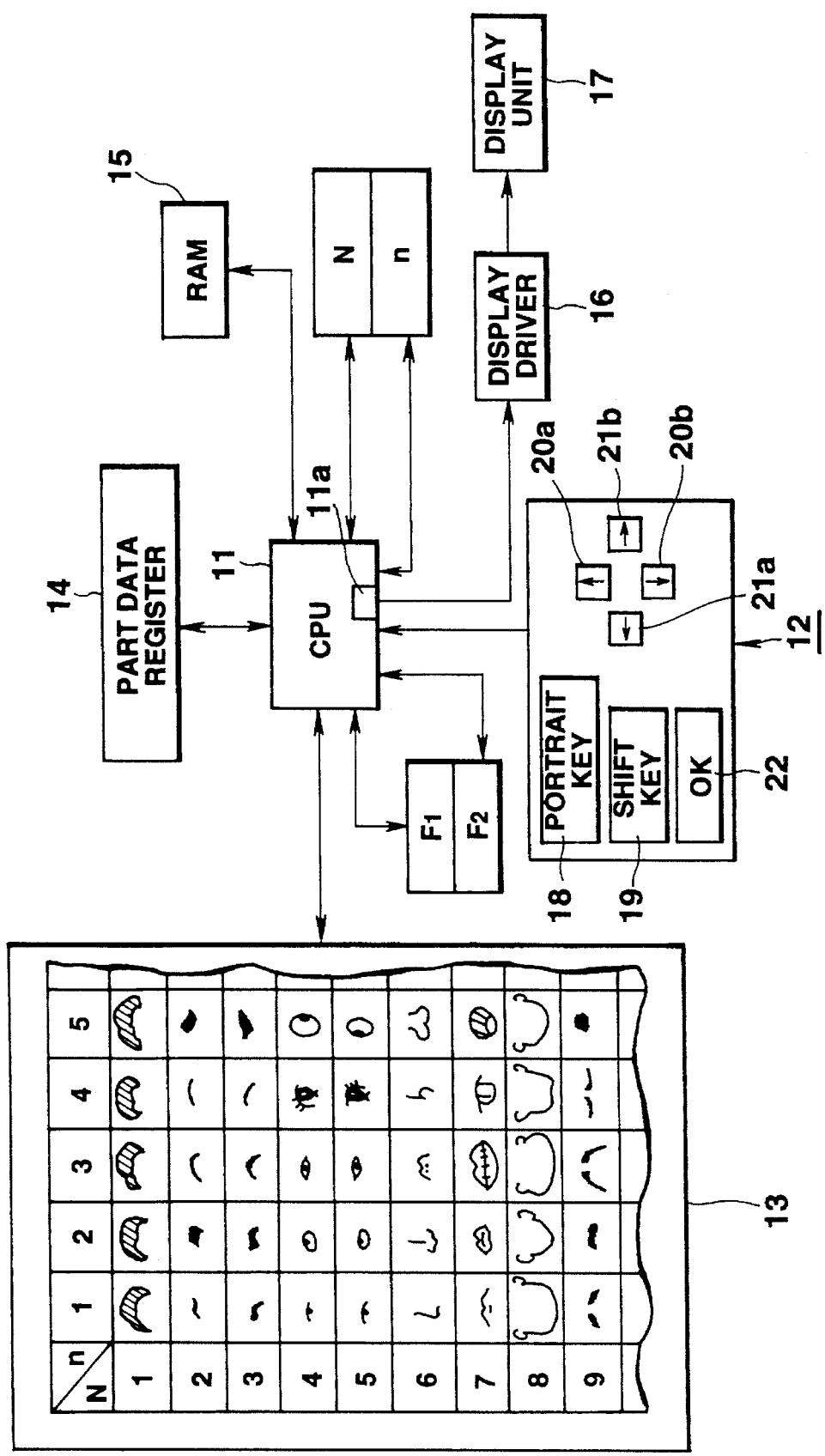
FIGS. 1 to 5 and FIGS. 6A to 6E are views for illustrating a first embodiment of the present invention.

FIG. 1 is a circuit diagram of an image displaying apparatus according to the present invention. In FIG. 1, in response to a key operation signal supplied thereto from a key input unit 12, a central processing unit (CPU) 11 performs a control operation to control operations of peripheral circuits in accordance with a portrait composing program previously stored therein. The CPU 11 is provided with a composing RAM 11a which stores combined image data to be described later. Further, the CPU 11 is connected with the above key input unit 12, a part ROM 13, a part data register 14, and a RAM 15. A liquid crystal dot matrix display unit 17 is connected through a display driver 16 to the CPU 11.

Furthermore, the CPU 11 is connected with a portrait flag register F1, a shift flag register F2, a part designating counter N and a pattern selecting counter n.

The key input unit 12 is provided with a "portrait" key 18, a shift key 19, up/down keys 20a and 20b, left/right keys 21a and 21b, an "OK" key 22 and other various function keys. The portrait key 18 is operated to set a montage composing mode in which a portrait is composed and/or modified. The shift key 19 is operated to set a pattern shift mode in which an arbitrary part pattern is moved on a portrait. The up/down keys 20a and 20b function in the montage composing mode as part designating keys for designating a part such as a right eye, a left eye, a nose, a mouth, a right eyebrow and a left eyebrow, and function in the pattern shift mode as up/down keys for moving a part pattern in an up/down direction. The left/right keys 21a and 21b function in the montage composing mode as pattern selecting keys for selecting a part pattern of the part designated by the up/down key, and function in the pattern shift mode as left/right keys for moving the part pattern in a left/right direction. The OK key 22 is operated to register a portrait pattern which has been finally settled and displayed through a pattern selecting process for selecting a part pattern of each part and a pattern moving process for moving the selected part patterns.

To the portrait flag register F1 is set a flag "1" which indicates that the montage composing mode has been set by operation of the portrait key 18 of the key input unit 12.

To the shift flag register F2 is set a flag "1" which indicates that the pattern shift mode has been set by operation of the shift key 19 of the key input unit 12.

In the part ROM 13 are previously stored a number of part patterns of elements (i.e., parts) which compose a human face, such as a hair style, right and left eyebrows, right and left eyes, a nose, a mouth, an outline of a face, hair and so on. More specifically, a number of different part patterns of each of the parts are stored as bit map pattern data respectively at memory areas, addresses of which are designated by a row address N and a column address n.

The memory area in the above part ROM 13 in which one bit map pattern data is memorized is comprised of, for example, 1024 bits (32 bits by 32 bits), and bit map pattern data of the same part are memorized respectively in predetermined memory areas within the above 1024 bit area. More specifically, the bit map pattern data are memorized in different figures at different positions within the above predetermined memory area.

Figure 2:
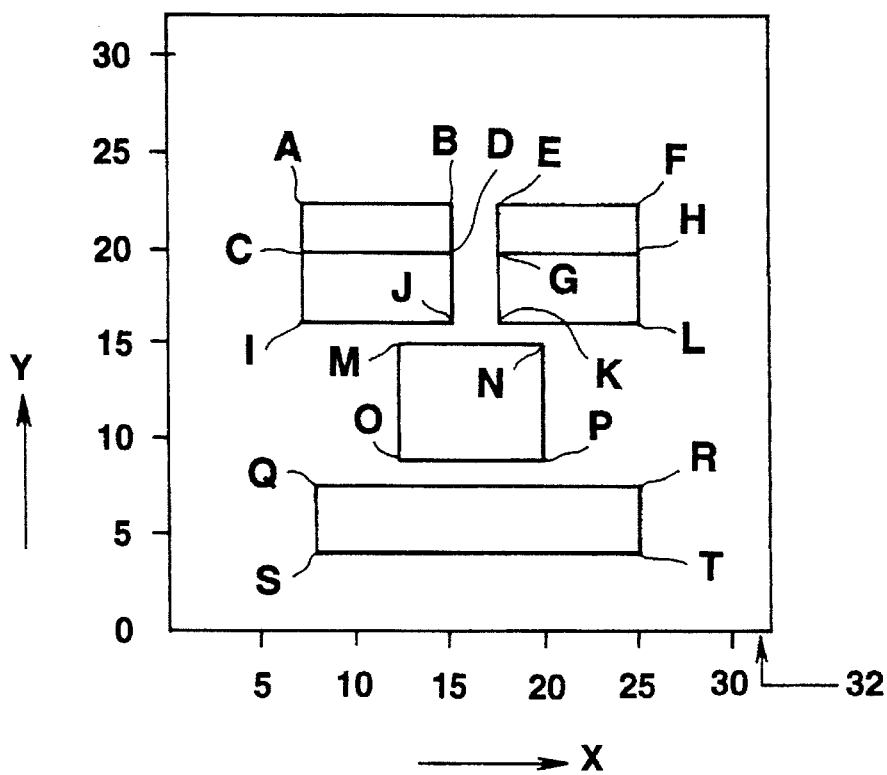

FIG. 2 is a view showing the above bit map area of 32 bits by 32 bits, in which bit map patterns of an eyebrow part are formed in different figures at different positions only within two areas which are surrounded by lines connecting points A and B, B and D, D and C, and C and A, and by lines connecting points E and F, F and H, H and G, and G and E, respectively. The part of an eye has bit map patterns which are formed within two areas surrounded by lines connecting points C and D, D and J, J and I, and I and C, and by lines connecting points G and H, H and L, L and K, and K and G. The part of nose has bit map patterns which are formed in an area surrounded by lines connecting points M and N, N and P, P and O, and O and M. Similarly, the part of a mouth has bit map patterns which are formed within an area surrounded by lines connecting points Q and R, R and T, T and S, and S and Q. The parts of a hair style and an outline of face have bit map patterns formed in areas outside the above mentioned areas.

Accordingly, even if any of the bit map patterns are combined, the parts are displayed at separate positions and are not displayed in an overlapped manner.

The part designating counter N is renewed in its part designating value (N) in response to operation of the up/down keys 20a and 20b which function as the part designating keys in the montage composing mode, and the row address of the part ROM 13 is designated by the above renewed part designating value (N).

The pattern selecting counter n is renewed in its pattern selecting value (n) in response to operation of the left/right keys 21a and 21b which function as the pattern selecting keys in the montage composing mode, and the column address of the part ROM 13 is designated by the above renewed pattern selecting value (n).

Figure 3:
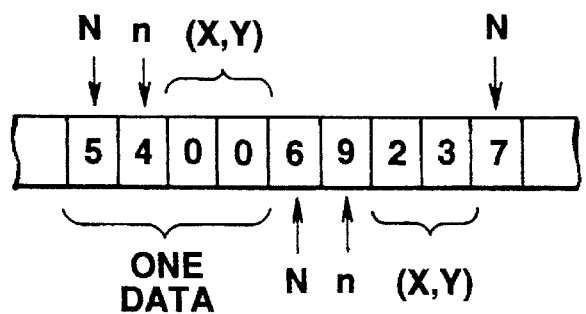

FIG. 3 is a view partially showing a memory area of the above part data register 14. In the part data register 14 are stored the part designating value (N) and the pattern selecting value (n) which have been set in the part designating counter N and the pattern selecting register n, respectively, in the montage composing mode. The above values (N) and (n) compose count data (N, n). Display position code data (X, Y) that indicates a position where the relevant part pattern is to be displayed is also stored together with the count data (N, n) in the part data register 14.

The part data register 14 is capable of storing combinations of the count data (N, n) and the display position code data (X, Y) by the same number as that of parts which are necessary at least to compose a portrait. The combinations of data stored in the part data register 14 compose a portrait data (a montage data).

The display position code data (X, Y) stored in the part data register 14 designates a standard display position by (0, 0), and the parts with the above display position code data (X=0, Y=0) affixed to, i.e., the bit map pattern in the part ROM 13 which is designated by the pattern code (N, n) are displayed at respective predetermined positions (at respective standard positions). Change in the above display position code (X) changes the display position in the up/down direction (an up-and-down direction as viewed in the figure) by one display dot unit and change in the display position code (Y) changes the display position in the left/right direction (a transverse direction as viewed in the figure) by one display dot unit.

To the RAM 15 is transferred and memorized a portrait data (montage data) stored in the part data register 14 in response to operation of the OK key 22 of the key input unit 12.

The display driver 16 drives the liquid crystal dot matrix display unit (display unit) 17 of 32 dots by 32 dots in accordance with data supplied from the CPU 11 thereto to be displayed. Respective parts, i.e., part patterns corresponding to part/pattern code (N, n) are read out from the part ROM 13 to be combined. The combined part patterns are stored in a composing RAM 11a in the CPU 11, and then are displayed on the display unit 17.

Bits of the ROM 13 of 32 bits by 32 bits correspond to dots of the display unit 17 of 32 dots by 32 dots, respectively. The display positions on the display unit 17 where the respective part patterns are to be displayed are controlled with respect to the previously determined positions (standard positions) in accordance with the display position code (X, Y) affixed to the above part/pattern code (N, n).

Now, the operation of the image displaying apparatus with the above mentioned structure will be described in detail.

Figure 4:
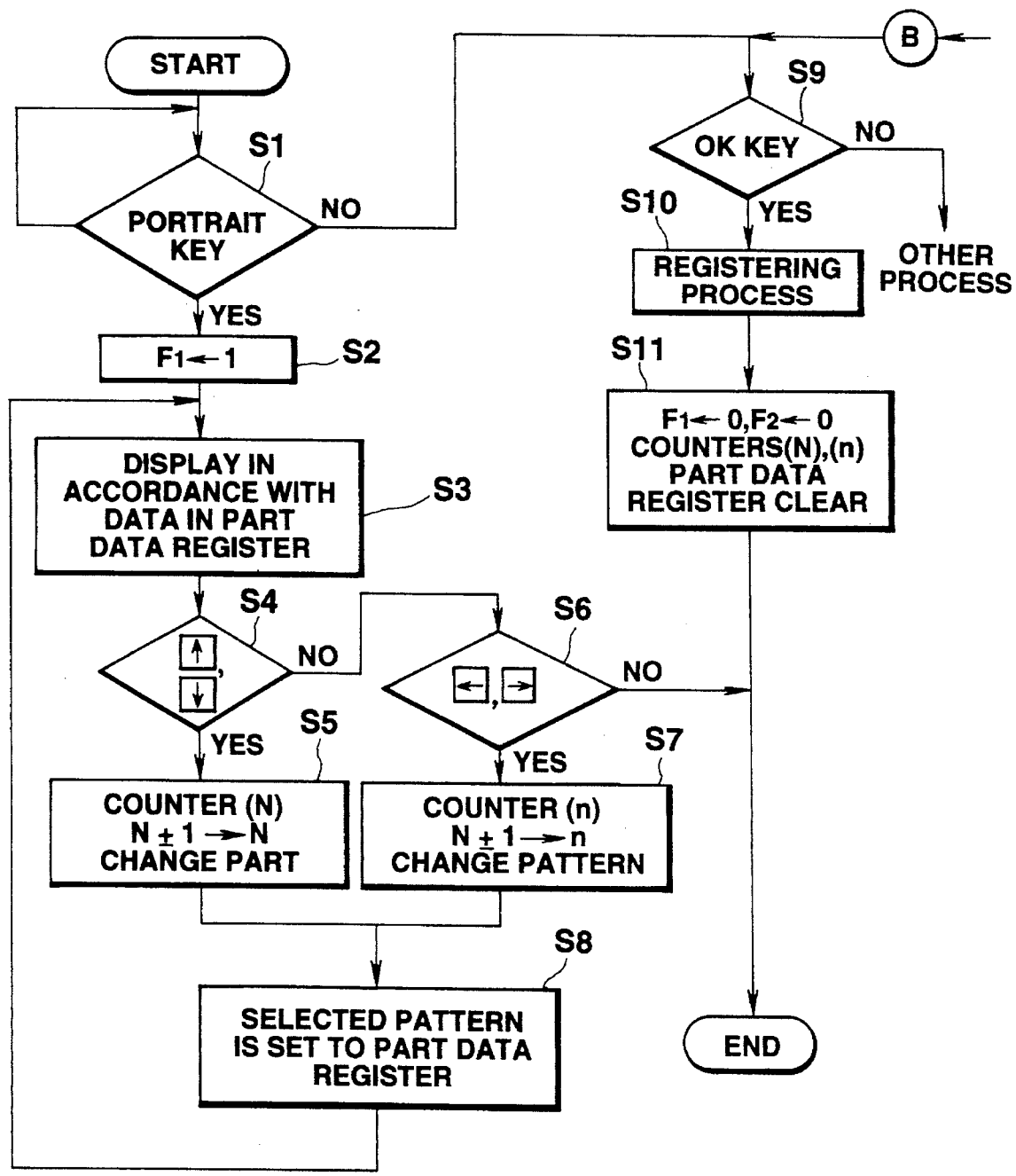
Figure 5:
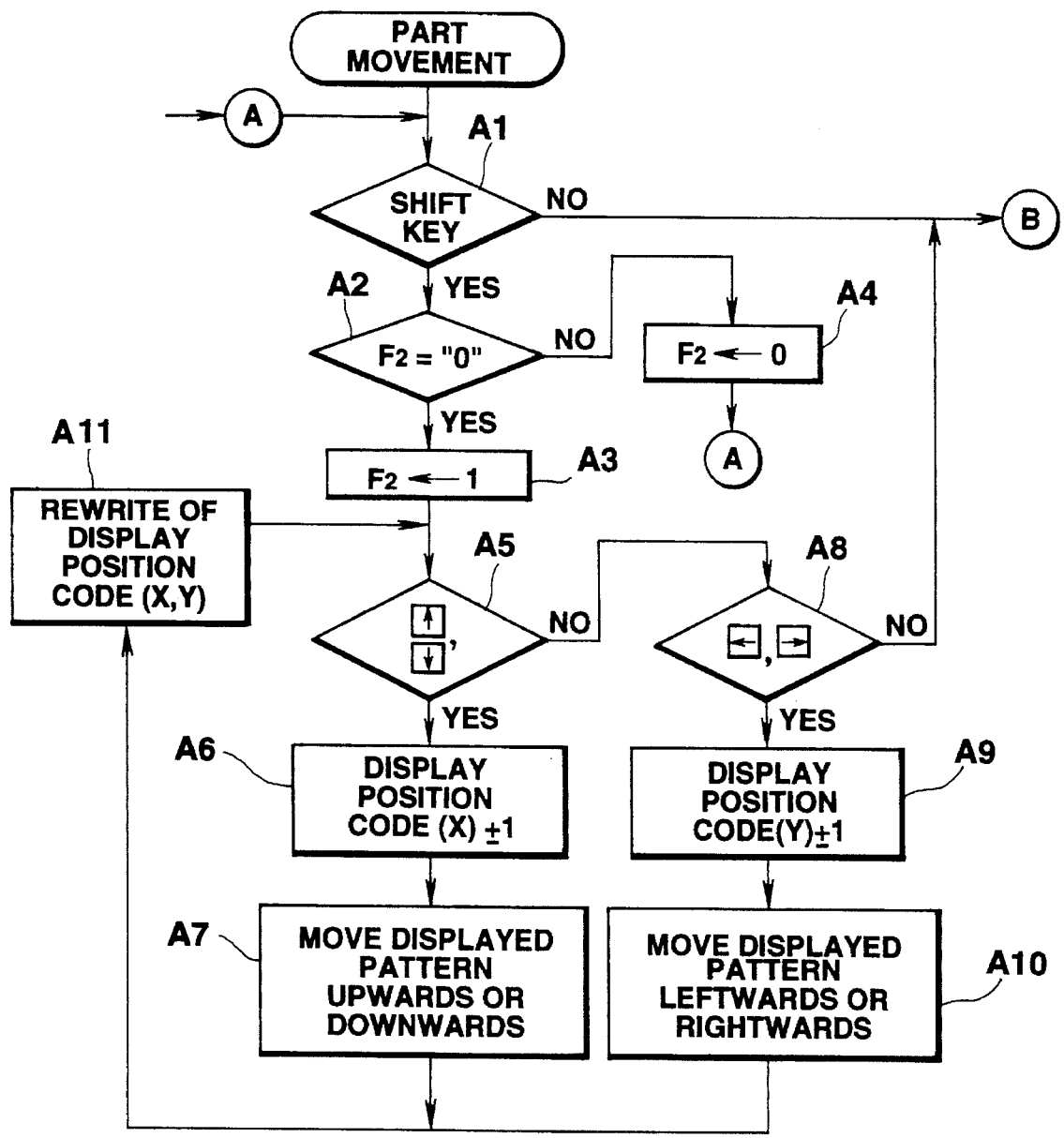

FIG. 4 is a flow chart of a montage composing process performed in the above image displaying apparatus. FIG. 5 is a flow chart of a part pattern moving process executed during the montage composing process. FIGS. 6A–6E is a view showing an indication of a portrait data (montage data) displayed during the montage composing process and the part pattern moving process.

When the portrait key 18 of the key input unit 12 is operated, the operation of the key 18 is detected at step S1. At the following step S2, a state flag "1" is set to the portrait flag register F1, thereby the montage composing mode being set.

Part patterns are read out from the part ROM 13 in accordance with the portrait data (montage data) stored in the part data register 14, and are combined to be displayed on the display unit 17 through the display driver 16 at step S3.

Immediately after operation of the portrait key 18, nothing is displayed on the display unit 17 since data has not yet been stored in the part data register 14.

When the up/down keys 20a and 20b (part designating keys) are operated at step S4 to compose a portrait, the count value (N) of the part designating counter N is renewed by +1 or −1 every operation of the part designating keys, thereby a part (a hair style, eyebrows, eyes, a nose, a mouth, an outline of a face, hair and so on) stored in the part ROM 13 being designated at step S4.

When the left/right keys 21a and 21b (pattern selecting keys) are operated, the count value (n) of the pattern selecting counter n is renewed by +1 or −1 every operation of the pattern selecting keys, thereby a part pattern of the designated part being selected at steps S6 and S7.

Then, the count value (N) obtained by the above part designating operation to designate a part and the count value (n) obtained by the pattern selecting operation to select a part pattern are stored in the part data register 14 as part/pattern code (N, n) at step S8.

When the above part/pattern code (N, n) is newly stored in the part data register 14, the display position code (X, Y) to be affixed thereto is automatically set to (0, 0) corresponding to the standard position.

A part pattern represented by the part/pattern code (N, n) stored in the part data register 14 is read out from the part ROM 13, and is displayed through the display driver 16 on the display unit 17 at step S3.

More specifically, when, for example, the part/pattern code (N=4, n=3) is set by the part designating operation and the pattern selecting operation, the third part pattern of the fourth part (a right eye) is read out from the part ROM 13, and is displayed on the display unit 17.

When the part designating operation and the pattern selecting operation are repeatedly executed, part/pattern codes (N, n) of respective parts are stored together with the pertinent display position codes (X, Y) corresponding to the standard display positions in the part data register 14, and part patterns corresponding to the part/pattern codes (N, n) are successively read out from the part ROM 13 to be combined into a portrait. The CPU 11 displays the combined portrait through the display driver 16 on the display unit 17, for example, as shown in FIG. 6A, at steps S3 to S8.

When a desired portrait is obtained on the display unit 17 by combining part patterns of respective parts, and the OK key 22 of the key input unit 12 is operated, portrait (montage) data which have been stored in the part data register 14 as part/pattern codes (N, n) of the parts and their display position codes (X, Y) are transferred to and registered in the RAM 15 through the CPU 11 at steps S1 to S9 and S10.

Then, all the portrait flag register F1, the shift flag register F2, the pattern selecting counter n, the part designating counter N and the part data register 14 are cleared to "0" at step S11.

Figure 6A:
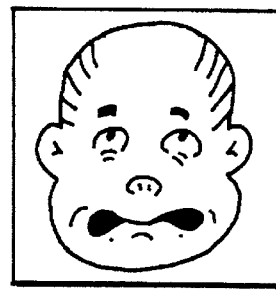

Meanwhile, in the case that a portrait as shown in FIG. 6A has been composed in the montage composing process but the user wants to move the nose of the portrait to an upper position or a lower position, the user designates the nose of the portrait by the up/down keys (part designating keys) 20a, 20b. Then, the part/pattern code (N, n) and the display position code (X, Y) corresponding to the designated part (the nose) stored in the part data register 14 are made accessible at steps S3 to S8.

In this state, when the shift key 19 of the key input 12 is operated, the operation advances from step A1 of the flow chart of FIG. 5 to step A2, where it is judged whether the shift flag register F2 is set at "0". When it is determined at step A2 that the shift flag register F2 is set at "0", the state flag "1" is set to the shift flag register F2 at step A3.

When the shift key 19 is operated once more, the operation goes from step A2 to step A4, where the flag register F2 is reset to "0", and the pattern shift mode is released.

Figure 6B:
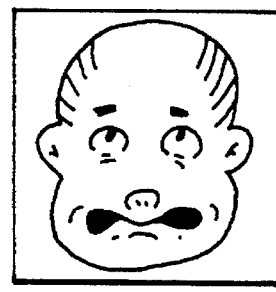

In the pattern shift mode, when the up/down key 20b (a downward moving key) is operated at step A5, the value X of the display position code (X, Y) attached to the part/pattern code (N, n) corresponding to the part "nose" in the part data register 14 is decremented by "−1" every operation of the up/down key 20b at step A6. Simultaneously, the part pattern of the nose in the displayed portrait is moved downwards at step A7 by one display dot as shown in FIG. 6B.

Figure 6C:
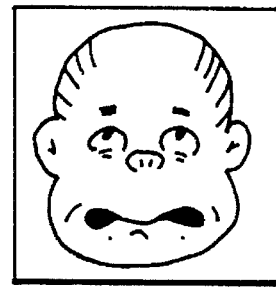

When the up/down key 20a (an upward moving key) is operated at step A5, the value X of the display position code (X, Y) attached to the part/pattern code (N, n) corresponding to the part "nose" in the part data register 14 is incremented by "+1" every operation of the up/down key 20a at step A6. Simultaneously, the part pattern of the nose in the displayed portrait is moved upwards at step A7 by one display dot as shown in FIG. 6C.

At the following step A11, the display position code decremented by "−1", or incremented by "+1" is written into the part data register 14.

Meanwhile, when the portrait as shown in FIG. 6A is composed in the montage composing process but the user wants to move the eyes of the portrait a little towards the center of the portrait, the user designates the right eye of the portrait by the up/down keys (part designating keys) 20a, 20b. Then, the part/pattern code (N, n) and the display position code (X, Y) corresponding to the designated part (a part "right eye" part) stored in the part data register 14 are made accessible at steps S3 to S8.

When the shift key 19 of the key input 12 is operated, the CPU 11 is set to the pattern shift mode, and the state flag "1" is set to the shift flag register F2 (steps A1 to A3).

Then, when the left/right key 21b (a rightward moving key) is operated, the value Y of the display position code (X, Y) attached to the part/pattern code (N, n) corresponding to the part "right eye" in the part data register 14 is renewed by "+1" every operation of the left/right key 21b. Simultaneously, the part pattern of the part "right eye" of the displayed portrait is moved rightwards as viewed in the figure by one display dot as shown in FIG. 6D (step A5, steps A8 to A10, A11).

When the left/right key 21a (a leftward moving key) is operated with the left eye designated, the value Y of the display position code (X, Y) attached to the part/pattern code (N, n) corresponding to the part "left eye" in the part data register 14 is renewed by "−1" every operation of the left/right key 21a. Simultaneously, the part pattern of the part "left eye" of the displayed portrait is moved leftwards as viewed in the figure by one display dot as shown in FIG. 6D (steps A1 to A3, step A5, steps A8 to A10, A11).

Figure 6D:
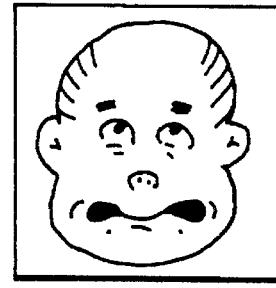

In this manner, the parts "eyes" of the portrait are moved towards the center of the portrait to take positions a little to the center as shown in FIG. 6D as compared with the original positions (standard positions) in the portrait shown in FIG. 6A.

Furthermore, in the case that the portrait as shown in FIG. 6A has been composed but the user wants to put the parts "eyes" a little apart from each other, the user selects the part "right eye" by the operation similar to the above operation and operates the left/right key 21a (a leftward moving key) to move the part "right eye" rightwards as viewed in the figure. Similarly, the user selects the part "left eye" by the operation similar to the above operation and operates the left/right key 21b (a rightward moving key) to move the part "left eye" leftwards as viewed in the figure.

Figure 6E:
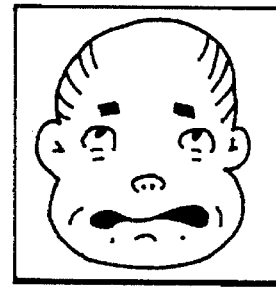

In this manner, the parts "eyes" of the portrait are moved to take positions a little apart from each other as shown in FIG. 6E as compared with those of the portrait shown in FIG. 6A.

When a desired portrait is completed on the display unit 17 by combining part patterns of the respective parts and moving these part patterns and the OK key 22 of the key input unit 12 is operated, the corresponding portrait (montage) data which is stored in the part data register 14 as part/pattern code (N, n) and the display position codes (X, Y) of the respective parts is transferred through the CPU 11 to the RAM 15 and is registered therein (steps S9, S10).

Then, at the following step S11, all the portrait flag register F1, the shift flag register F2, the pattern selecting counter n, the part designating counter N and the part data register 14 are cleared to "0".

Second Embodiment

A second embodiment of the image displaying apparatus of the present invention will be described with reference to the FIGS. 7 to 10.

Figure 7:
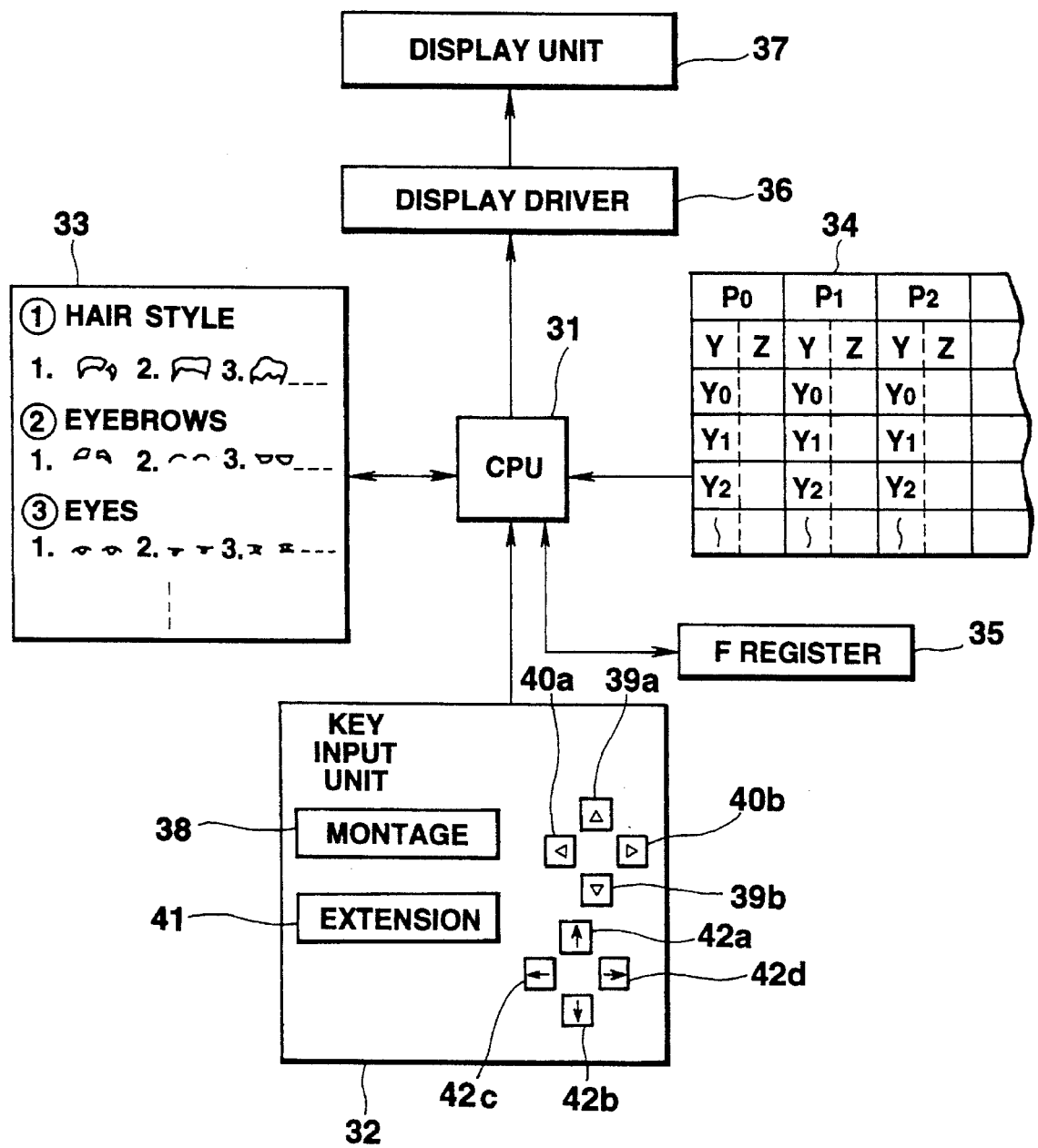
FIGS. 7 to 10 are views for illustrating a second embodiment of the present invention.

FIG. 7 is a circuit diagram of the second embodiment of the image displaying apparatus. The image displaying apparatus includes a central processing unit (CPU) 31.

In response to a key operation signal supplied thereto from a key input unit 32, the (CPU) 31 performs a control operation to control operations of peripheral circuits in accordance with a program previously stored therein. The CPU 11 is connected with the above key input unit 32, a part ROM 33, a RAM 34 and a flag register 35. A display unit 37 including a liquid crystal dot matrix unit is connected through a display driver 36 to the CPU 31.

The key input unit 32 is provided with a montage key 38, part selecting keys 39a and 39b, part pattern selecting keys 40a and 40b, an extension key 41, an upward extending key 42a, a downward extending key 42b, a leftward extending key 42c, a rightward extending key 42d and other various function keys. The montage key 38 is operated to set a montage composing mode. The part selecting keys 39a and 39b are operated to select parts of a human face such as a hair style, eyes, a nose, a mouth. The part pattern selecting keys 40a and 40b are operated to select a part pattern of the part selected by the part selecting keys 39a and 39b. The extension key 41 is operated to set an extension mode in which a selected part pattern is extended. The upward extending key 42a, the downward extending key 42b, the leftward extending key 42c, the rightward extending key 42d are operated to designate a direction in which the part pattern is extended.

A montage of a human face is comprised of a set of parts (P0, P1, P2, . . . ), each of which is representative of one of face elements such as a hair style, eyes, a nose, a mouth, eyebrows and so on. A plurality of part patterns are prepared for each of the parts, and are stored as bit map data each bearing a part-pattern number (Y0, Y1, Y2, . . . ) affixed thereto at predetermined areas in the part ROM 33, respectively. In the present embodiment, for example, a hair style pattern of "hair parted at the side" is stored at an address "1" of the part of "hair style".

Montage data includes part patterns of the set of parts, each of which part patterns is selected by operation of the part selecting keys 39a, 39b and the part pattern selecting keys 40a, 40b. The part-pattern numbers (Y0, Y1, Y2, ...) of the part patterns of the set of parts included in the montage data are stored in the RAM 34. In the present embodiment, the RAM 34 is composed of a table on which the parts (P0, P1, P2, ...) and the part-pattern numbers (Y0, Y1, Y2, ...) are correlated to one another. A pointer (Z) is prepared for each of the parts (P0, P1, P2, ...) to designate the part-pattern number. For example, the part patterns of the set of parts composing the montage are given by (P0, Y0) (hair style: 1st part pattern), (P1, Y1) (eyebrows: 3rd part pattern), (P2, Y2) (eyes: 2nd part pattern) and so on.

The pointer (Z) is used to designate both the part-pattern number of each of the parts and an extended state of the relevant part pattern. For example, Z=2 represents a normal state of the part pattern, Z=1 represents the part pattern extended upwards, Z=3 represents the part pattern extended downwards, Z=0 represents the part pattern extended leftwards and Z=4 represents the part pattern extended rightwards.

In other words, when the pointer (Z) on the part of "eyes" (P2) of the RAM 34 indicates the part-pattern number (Y0) and Z=0, the part "eyes" composing a portion of the montage has the 1st part pattern which is extended leftwards.

To the flag register 35 is set an extension flag of a part pattern in response to operation of the extension key 41 of the key input unit 32. The extension flag is reset when the extension key 41 is repeatedly operated.

The display driver 36 drives the display unit 37 in accordance with data to be displayed supplied from the CPU 11. For example, montage data (P0, Y), (P1, Y), (P2, Y) and so on which are read out from the RAM 34 in accordance with the indication of the pointer (Z) are combined with part patterns which are each read out from the ROM 33 in accordance with the part-pattern number (Y) of each of the parts. The montage data combined with the part patterns is sent through the display driver 36 to the display unit 37 to be displayed thereon.

Now, the operation of the second embodiment of the image displaying apparatus according to the present invention will be described.

Figure 8:
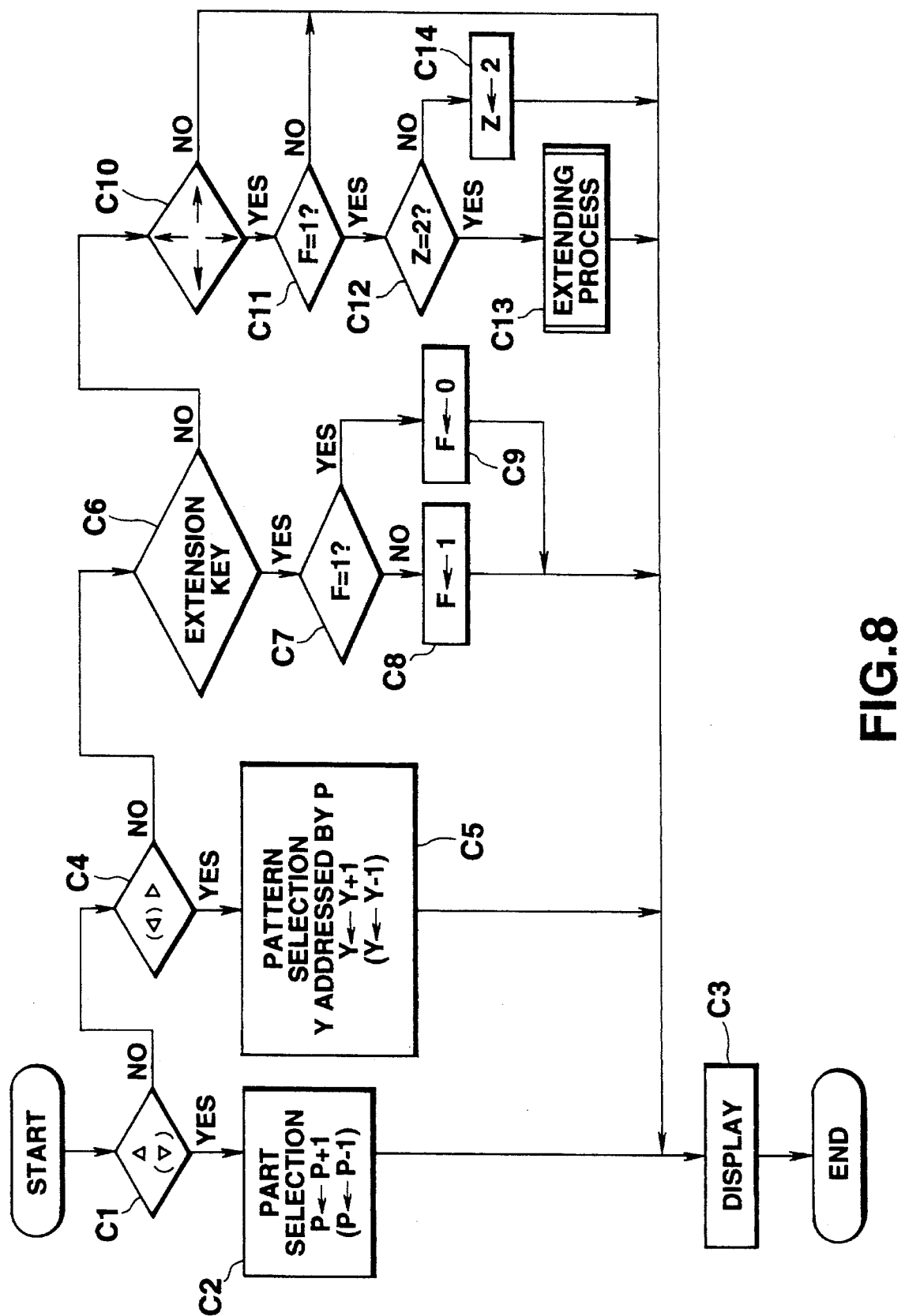
Figures 9, 10:
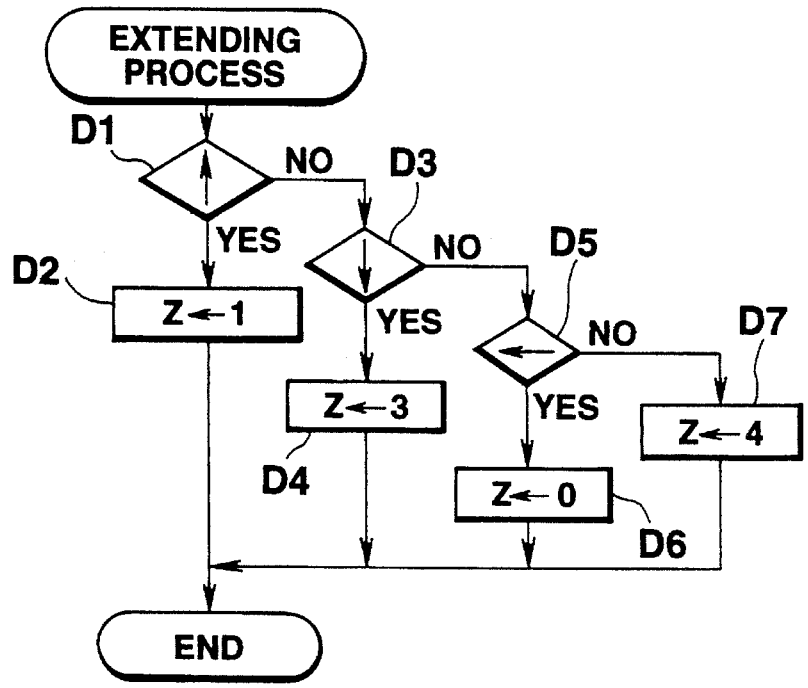

FIG. 8 is a flow chart of a montage composing process. FIG. 9 is a flow chart of a pattern extending process reformed during the montage composing process. FIG. 10 is a view illustrating extended part patterns.

To compose a desired portrait, the CPU 31 is set to a montage composing mode by operation of the montage key 38 of the key input unit 32. In the montage composing mode, a first part pattern of a first part (1st part pattern of the part "hair style") is read out from the part ROM 13, and is sent through the display driver 36 to the display unit 37 to be displayed thereon at a predetermined position.

The parts stored in the part ROM 33 such as the hair style (P0), the eyebrows (P1), the eyes (P2), the nose, the mouth are successively selected by operation of the part selecting keys 39a, 39b, and the relevant part patterns (Y0), (Y1), (Y2) and so on are further selected by operation of the part pattern keys 40a, 40b. The CPU 31 combines the selected part patterns of the respective parts to compose a portrait, and sends the combined part patterns through the display driver 36 to the display unit 37 to display the composed portrait thereon (steps C1 to C5 in the flow chart of FIG. 8).

When a register key (not shown) is operated with the composed portrait displayed on the display unit 37, the pointers (Z) are set for the respective part-pattern numbers (Y) of the parts (P0, P1, P2 and so on) in the RAM 34, the part-pattern numbers which compose the displayed portrait.

In this case, all the pointers (Z) are set to Z=2 (a normal state, the patterns are not extended).

Meanwhile, in a montage composing/displaying process at steps C1 to C5, when the extension key 41 of the key input unit 32 is operated with one of the part patterns of the portrait being selected (the selected part pattern is displayed on the display unit 37 in a blinking manner), the extension flag is set to the flag register 35, thereby it being indicated that the extension mode is set to the selected part pattern at steps C6 to C8.

In the case the extension flag has set the flag register 35 when the extension key 41 is operated, the indication of the extension mode is turned off (steps C6, C7 to step C9).

More specifically, when any one of the extending keys 42a to 42d is operated with the extension mode being set to the selected part pattern (for example, the part pattern of the part "eye") by operation of the extension key 41, it is confirmed that the extension flag is set to the flag register 35 and further it is confirmed that the pointer (Z) for the selected part pattern registered in the RAM 34 is set to Z=2 (a normal state). Then, the selected part pattern is subjected to an extending process in response to operation of the extending keys 42a to 42d (steps C10 to C13).

FIG. 9 is a flow chart of the above extending process. When the upward extending key 42a is operated, the pointer (Z) in the RAM 34 is set to Z=1 and simultaneously an upper half of the selected part pattern (for example, "eye") is extended upwards by a predetermined amount (steps D1 and D2).

On the other hand, when the downward extending key 42b is operated, the pointer (Z) in the RAM 34 is set to Z=3 and simultaneously a lower half of the selected part pattern (for example, "eye") is extended downwards by a predetermined amount (steps D1 to steps D3, D4).

When the leftward extending key 42c is operated, the pointer (Z) in the RAM 34 is set to Z=0 and simultaneously a left half of the selected part pattern (for example, "eye") is extended leftwards by a predetermined amount (steps D1 to D3, D5, and step D6).

Further, when the rightward extending key 42d is operated, the pointer (Z) in the RAM 34 is set to Z=4 and simultaneously a right half of the selected part pattern (for example, "eye") is extended rightwards by a predetermined amount (steps D1 to D3, D5, D7).

Then, the selected part patterns subjected to the extending process as mentioned above are combined with the part patterns of the other parts, thereby a portrait which includes the part "eye" extended in an arbitrary direction being composed and displayed.

Meanwhile, even though any one of the extending keys 42a to 42d is operated and the extension flag is set to the flag register 35, the pointer (Z) for the selected part pattern in the RAM 34 is reset to Z=2 again and normal part patterns are read out from the part ROM 33 to be combined and displayed, when the pointer (Z) is not set to Z=2 (the normal state) and the selected part patterns have been subjected to the extending process (steps C10 to C12, steps C14, C3).

With above described structure of the image displaying apparatus, a human face is divided into parts such as a hair style, eyebrows, eyes, a nose, a mouth and so on, and a plurality of different part patterns are prepared for each of the parts and are stored as bit map data in the part ROM 33. The part pattern of each of the parts is read out to the CPU 31 from the part ROM 33 using the part selecting keys 39a, 39b and the part pattern selecting keys 40a, 40b. The read out part patterns are combined to compose a portrait. The composed portrait is sent through the display driver 36 to the display unit 37 to be displayed thereon. Then, when the extending mode is set by operation of the extension key 41 and any one of the extending keys 42a to 42d is operated, a selected part pattern of the portrait is extended in an appropriate direction, and is combined with the other part patterns of the portrait to compose a fresh portrait. In this manner, the part patterns of each of the parts may be modified or extended in various directions, and therefore a wide variety of portraits may be composed using these modified part patterns other than those stored in the part ROM 33.

Third Embodiment

Now, a third embodiment of the image display apparatus according to the invention will be described with reference to the FIGS. 11 to 25B.

Figure 11:
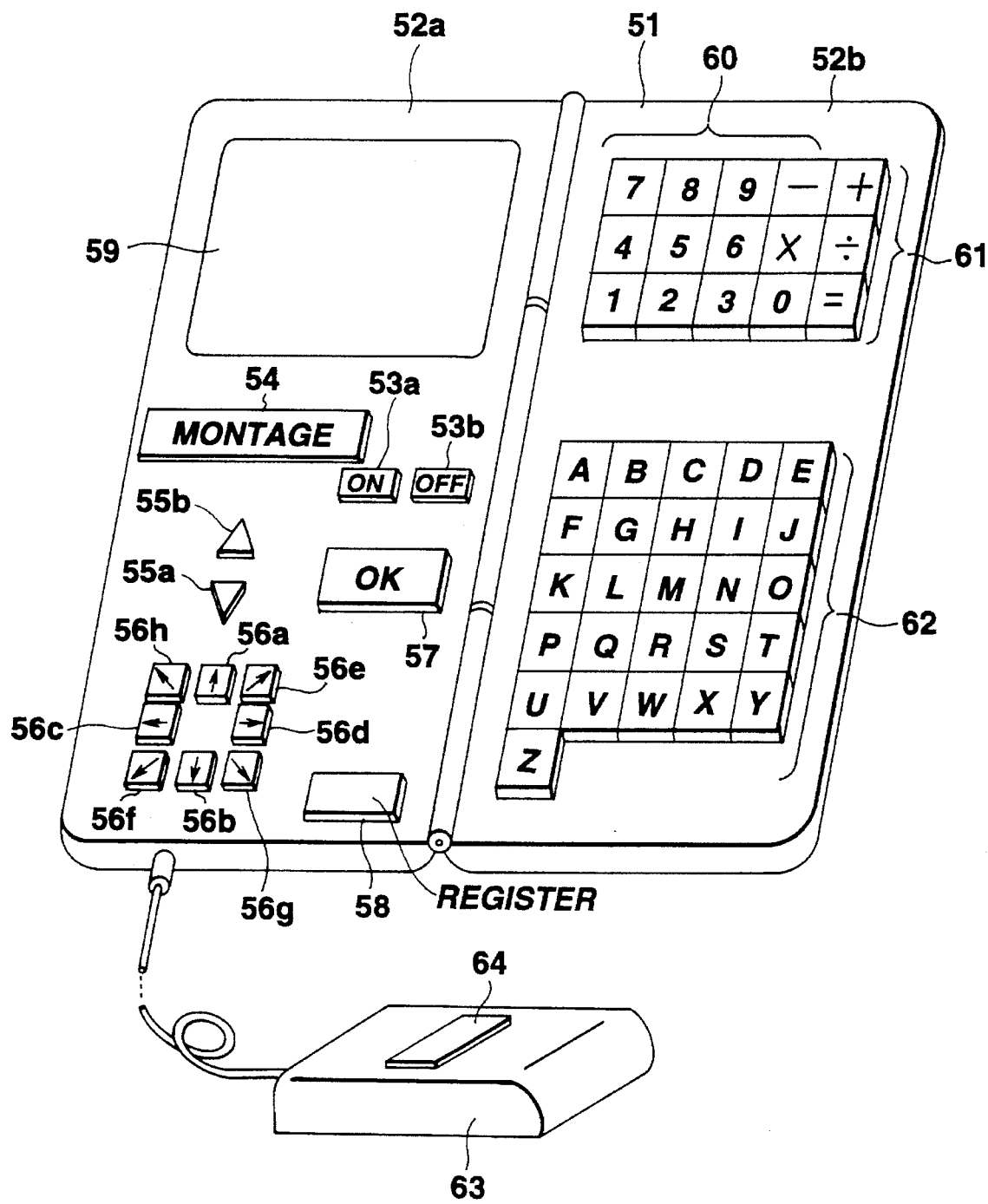
Figure 12:
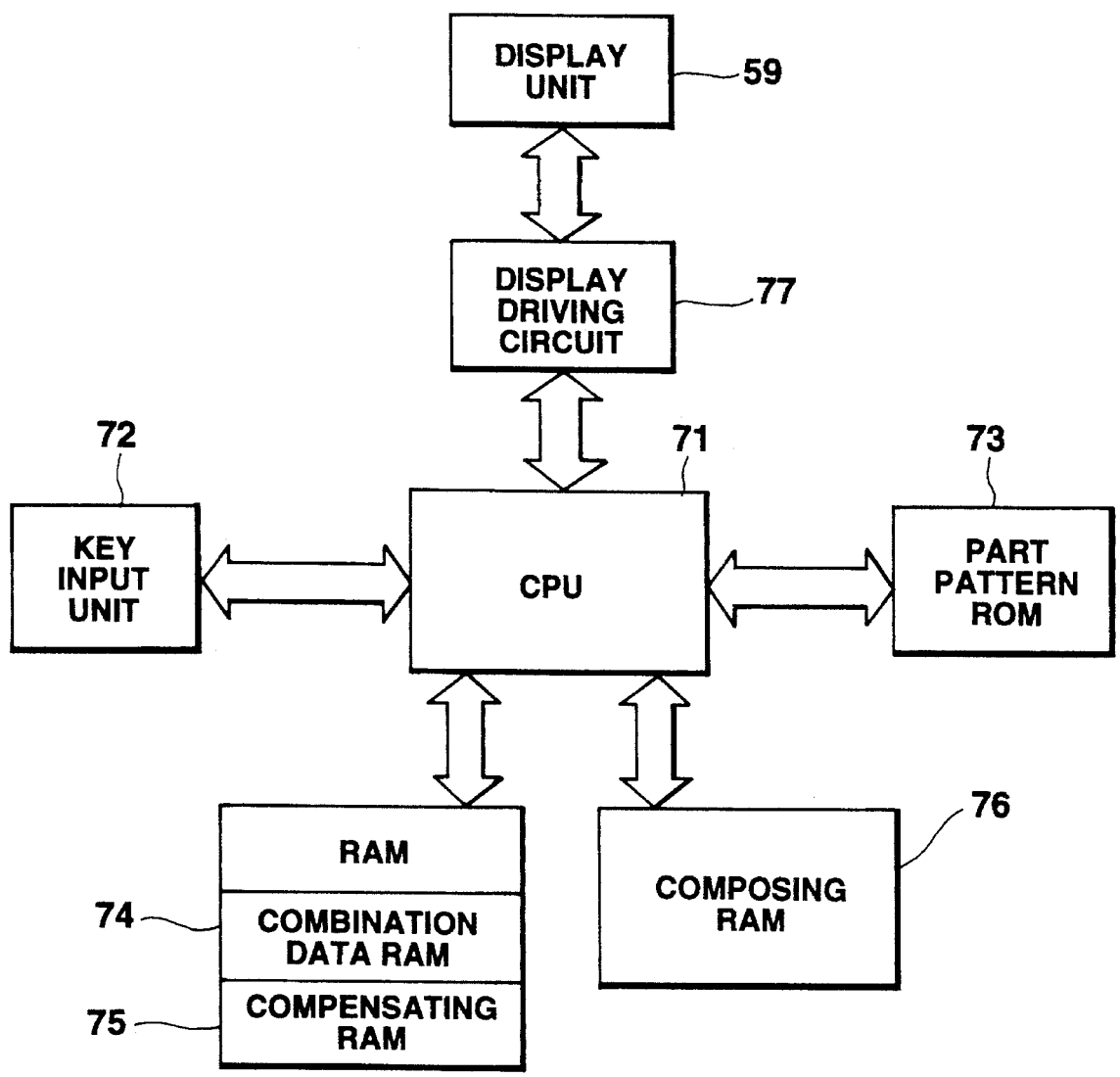

FIG. 11 is a view showing an external appearance of an electronic apparatus incorporating the third embodiment of the present invention.

A body of the electronic apparatus is composed of two casings (a lefthand casing and a righthand casing), which are connected to each other by means of a hinge, and are movable between an open position and a closed position. On a lefthand operation surface 52a of the lefthand casing are provided an ON key (a power on key) 53a, an OFF key (a power off key) 53b, a montage key 54, basic montage selecting keys 55a, 55b, eight-direction cursor keys 56a to 56h, an OK key 57 and a register key 58.

In this embodiment, a montage is composed of parts, each of which have a plurality of part patterns, and the user of the apparatus selects a part pattern of each of the parts from among the plurality of part patterns, and combines the selected part patterns to compose his desired montage.

The montage key 54 is operated to set a montage composing mode. The basic montage selecting keys 55a, 55b are operated to select a basic montage which is composed of a basic combination of previously memorized part patterns. The eight-direction cursor keys 56a to 56h are operated to a part pattern of a part which is to be changed during a montage composing process. The OK key 57 is operated when all part patterns for each of the parts have been selected. The register key is operated to register montage data which has been composed by selecting part patterns for each of the parts in the montage composing mode.

Further, a liquid crystal dot matrix display unit (hereafter, display unit) 59 is provided on the lefthand operation surface 52a of the lefthand casing.

On a righthand operation surface 52b of the apparatus body are provided numeral keys 60 for entering numerical data, operation keys 61 for performing four rules and alphabetical keys 62 for entering various data.

The apparatus body is connected with a mouse 63 to move a vector cursor on the display unit 59. The mouse 63 is equipped with a click key 64 to transfer movement data of the cursor to a central processing unit as will be described later.

In response to operation signals supplied from a key input unit 73 which is composed of the above mentioned various keys on the operation surfaces 52a, 52b, the central processing unit (CPU) 71 controls operations of peripheral circuits in accordance with a program memorized therein. The CPU 71 is connected with a part pattern ROM 73, a combination data RAM 74, a compensating RAM 75 and a composing RAM 76. The liquid crystal dot matrix display unit 59 is connected to the CPU 71 through a display driving circuit 77.

A plurality of part patterns of each of the parts (a face outline, a hair style, eyes, a nose, a mouth) which compose a portrait are memorized as bit map data in the part ROM 73. The part patterns of each part are comprised of a standard pattern and a plurality of similar patterns, and are stored in table.

Figure 13:
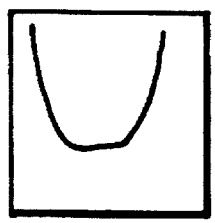
Figure 13:
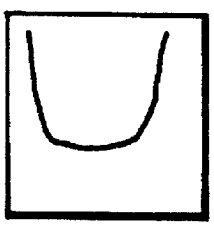
Figure 13:
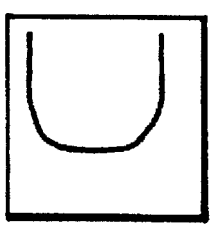
Figure 13:
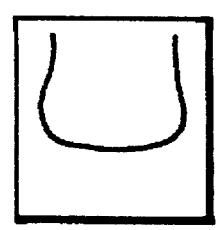
Figure 13:
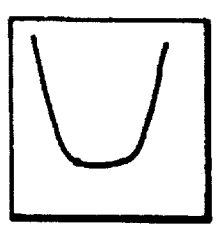
Figure 13:
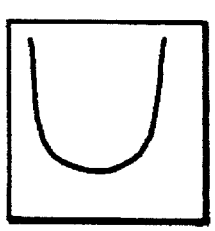
Figure 13:
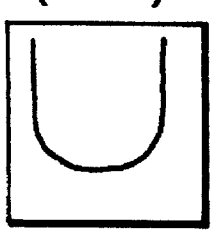
Figure 13:
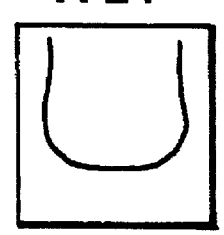
Figure 13:
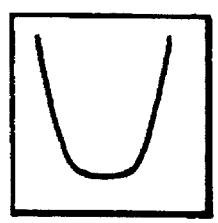
Figure 13:
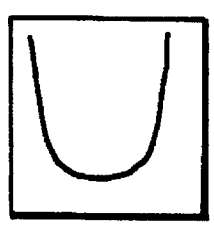
Figure 13:
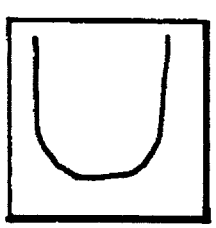
Figure 13:
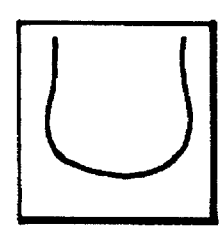
Figure 13:
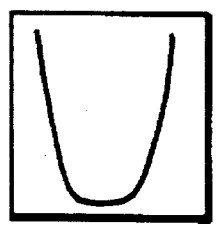
Figure 13:
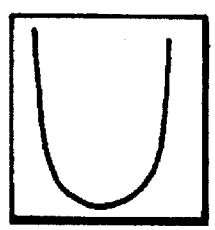
Figure 13:
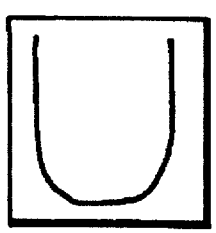
Figure 13:
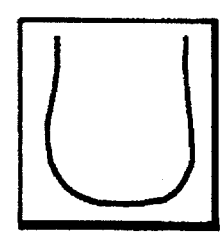

FIG. 13 is a view illustrating a storing state in which a group (A-group) of outline patterns of a square-jawed face are stored in the part pattern ROM 73.

Figure 14:
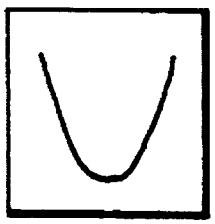
Figure 14:
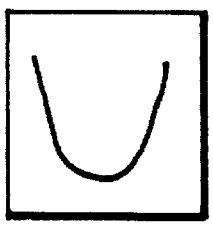
Figure 14:
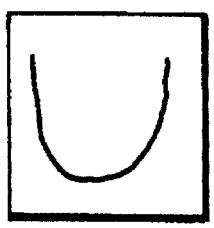
Figure 14:
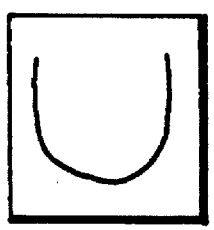
Figure 14:
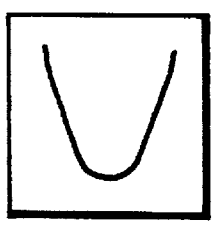
Figure 14:
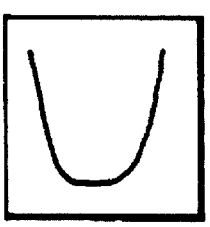
Figure 14:
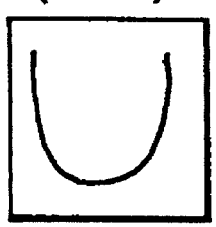
Figure 14:
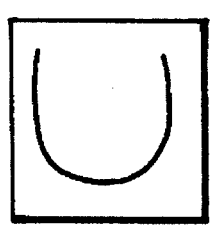
Figure 14:
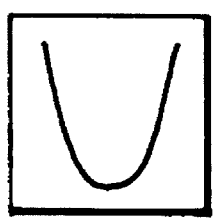
Figure 14:
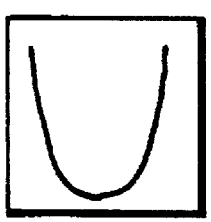
Figure 14:
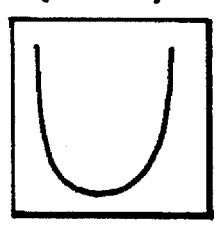
Figure 14:
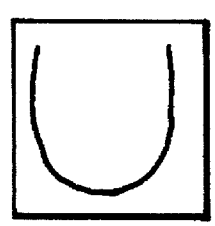
Figure 14:
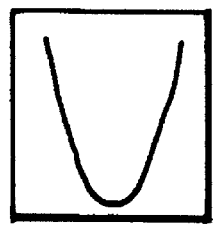
Figure 14:
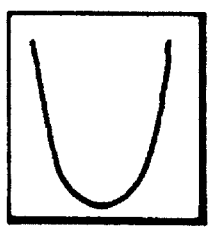
Figure 14:
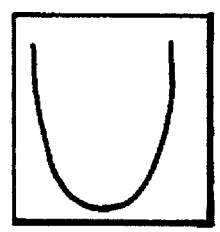
Figure 14:
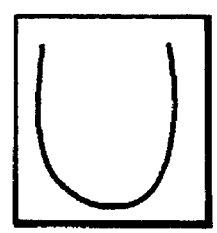

FIG. 14 is a view illustrating a storing state in which a group (B-group) of outline patterns of a round jaw are stored in the part pattern ROM 73.

Figure 15:
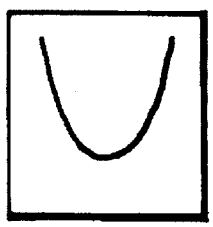
Figure 15:
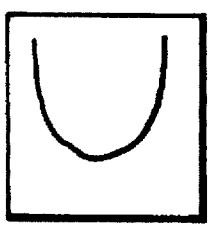
Figure 15:
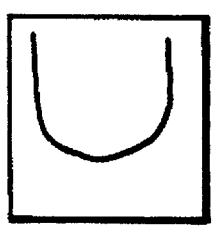
Figure 15:
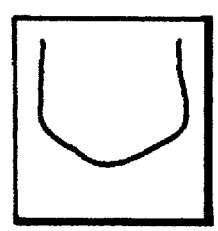
Figure 15:
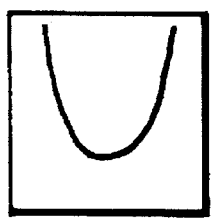
Figure 15:
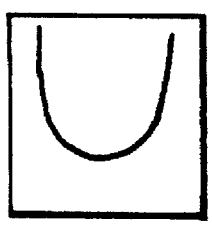
Figure 15:
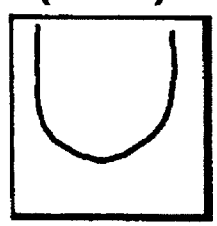
Figure 15:
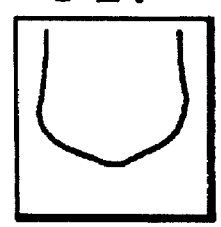
Figure 15:
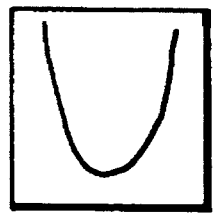
Figure 15:
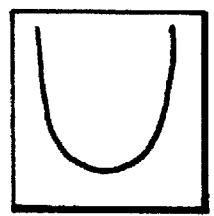
Figure 15:
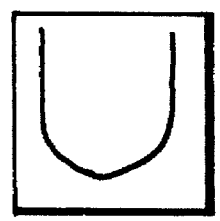
Figure 15:
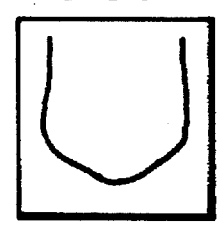
Figure 15:
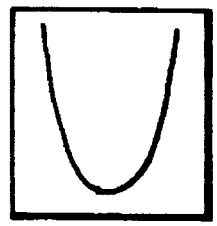
Figure 15:
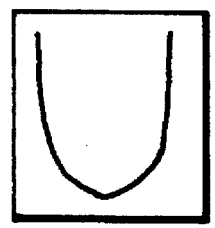
Figure 15:
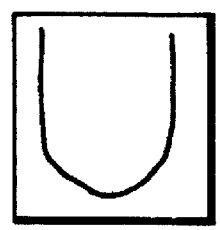
Figure 15:
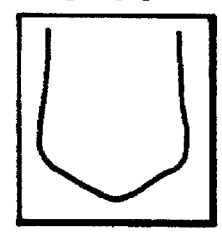

FIG. 15 is a view illustrating a storing state in which a group (C-group) of outline patterns of a sharp jaw are stored in the part pattern ROM 73.

In FIGS. 13 to 15, the standard pattern among the A-group outline patterns of the jaw is stored at 23rd area (A-23), the standard pattern among the B-group outline patterns of the jaw is also stored at 23rd area (B-23), the standard pattern among the C-group outline patterns of the jaw is also stored at 23rd area (C-23), and so on. As described above, the standard patterns of these respective part patterns are stored at 23rd areas, respectively. At the areas upper to the 23rd area, more round jaw patterns belonging to the same group (sort) are stored, and at areas lower to the 23rd area, longer jaw patterns belonging to the same group (sort) are stored, as seen in these figures. At the areas left to the 23rd area, narrower jaw patterns belonging to the same group (sort) are stored, and at areas right to the 23rd area, wider jaw patterns belonging to the same group (sort) are stored, as seen in these figures.

A selection of a sort of the outline part patterns is effected among the A-group, B-group and C-group of outline patterns, and a selection of an outline pattern of the same sort is effected among the outline patterns of the same sort.

Similar part patterns of other parts (a hair style, eyes, a nose, a mouth and so on) are stored in the part pattern ROM in a similar manner as described above.

Montage data (part-pattern number of each of the parts composing a portrait) composed in the montage composing mode is registered to the combination data RAM 74. In other words, part patterns corresponding, respectively, to part-pattern numbers included in the montage data are read out from the part pattern ROM 73, and are combined, thereby a portrait being composed.

In the compensating RAM 75 is stored an intermediate part pattern between nearby similar part patterns in the part pattern ROM 73, which intermediate part pattern is compensated by the CPU 71 based on the nearby similar part patterns in the part pattern ROM 73 when a similar part pattern is selected in the montage composing mode.

The composing RAM 76 serves to subject to a composing process the part patterns which are selectively read out from the part pattern ROM 73, or to subject to the composing process both the part patterns which are read out from the part pattern ROM 73 in accordance with the montage data registered to the combination data RAM 74 and the compensating part pattern read out from the compensating RAM 75. A montage pattern (montage data) obtained by combining the part patterns in the composing RAM 76 is sent through the display driving circuit 77 to the display unit 59 to be displayed thereon.

Now, the operation of the third embodiment will be described.

Figure 16:
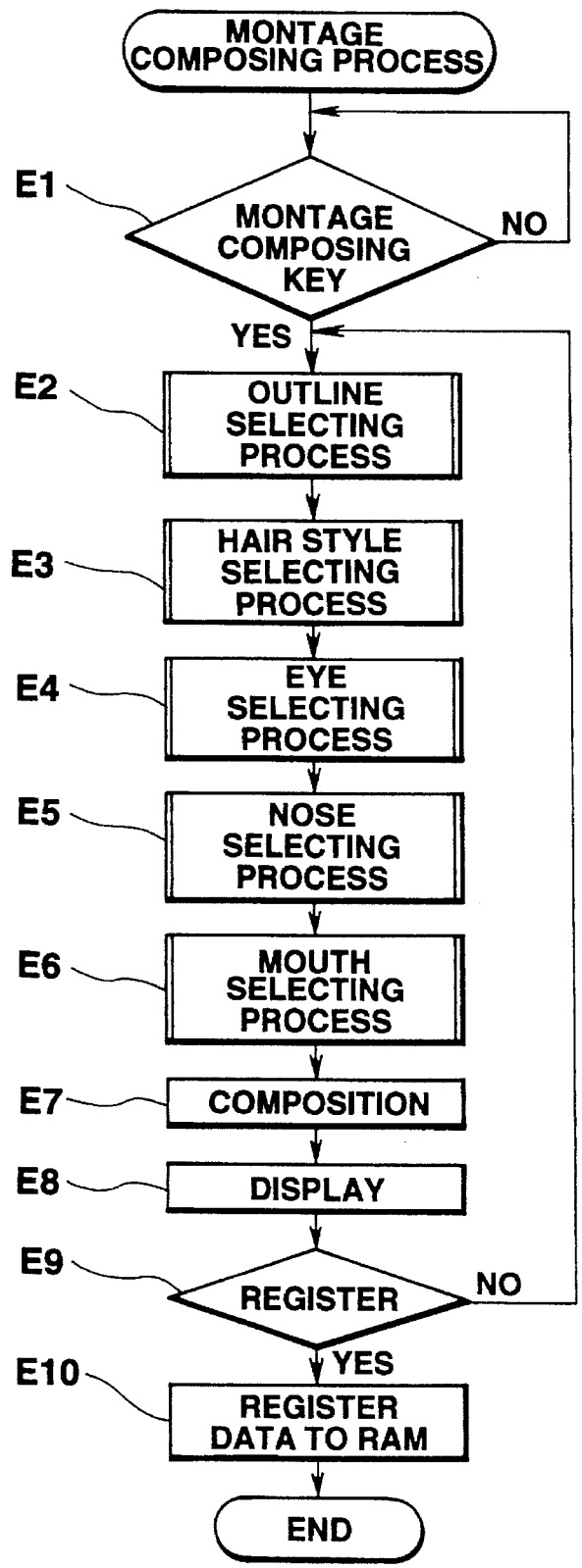
Figure 17:
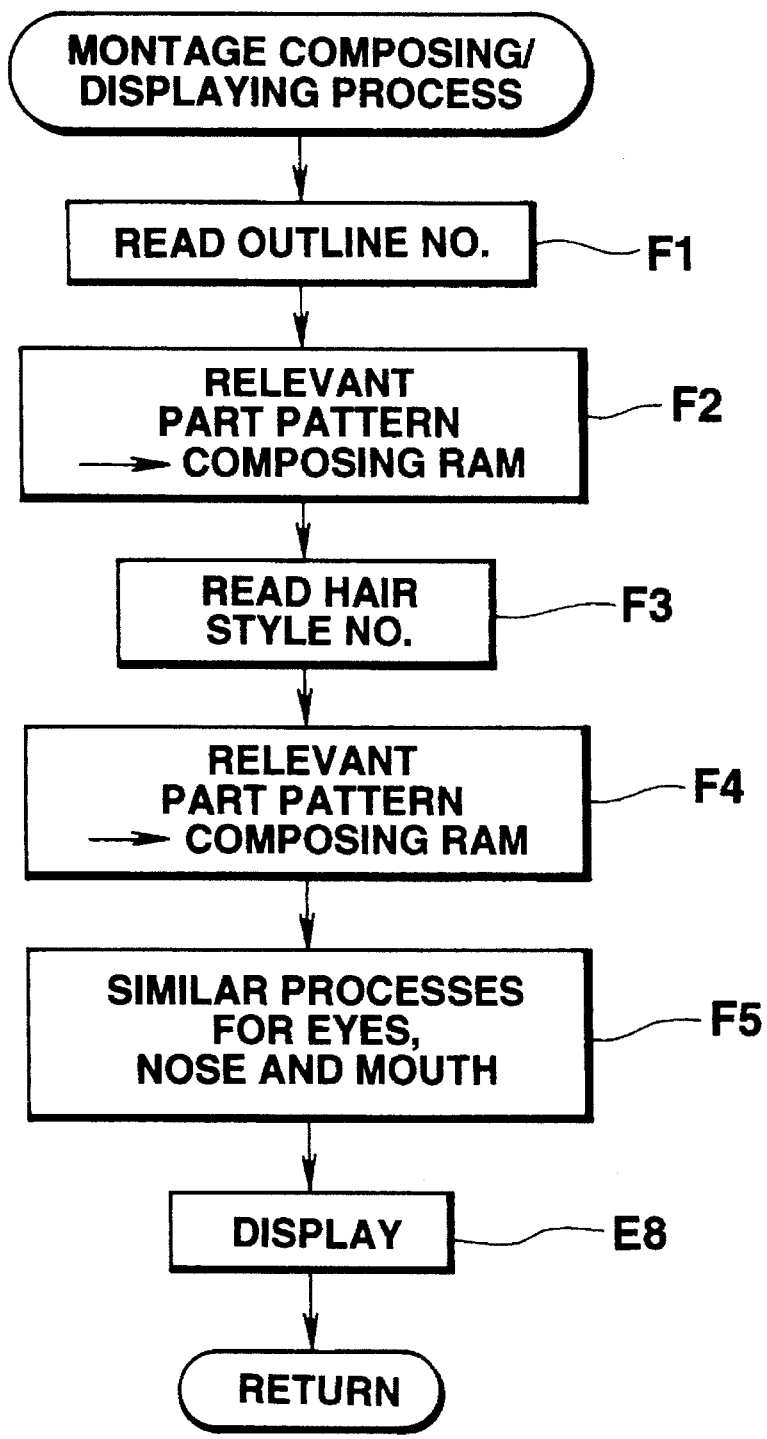

FIG. 16 is a flow chart of a montage composing process of the third embodiment. FIG. 17 is a flow chart of a composing process executed at steps E7 and E8 of the montage composing/displaying process of FIG. 16.

To compose a desired montage, the CPU 71 is set to the montage composing process by operation of the montage key 54 at step E1 of the flow chart of FIG. 16.

In the montage composing/displaying process, part patterns of the respective parts (an outline, a hair style, eyes, a nose, a mouth) are selected from among the part patterns stored in the part pattern ROM 73 by operation of the mouth key 63 or by operation of the eight-direction cursor keys 56a to 56h and the OK key 57 (steps E2 to E6). The part patterns thus selected are combined at step E7, and the combined part patterns are displayed on the display unit 59 at step E8.

The composing process at step E7 is illustrated in detail in FIG. 17. In FIG. 17, when a part-pattern number of each of the parts is designated to the part pattern ROM 73, the part patterns corresponding to the part-pattern number are read out from the part pattern ROM 73 and are sent to the composing RAM 76 (steps F1 to F5 of FIG. 16).

A montage pattern obtained by combining the part patterns in the composing RAM 76 is sent through the display driving circuit 77 to the display unit 59 to be displayed thereon at step E8.

When the register key 58 is operated, the operation of the register key 58 is detected at step E9 and the composing process is finished. Then, part-pattern numbers in the composing RAM 76, which compose the montage displayed at present, are registered to the combination data RAM 74 at step E10.

Now, an outline selecting process at step E2 will be described as an example of selecting processes to be executed at steps E2 to E6 during the above montage composing process.

Figure 18:
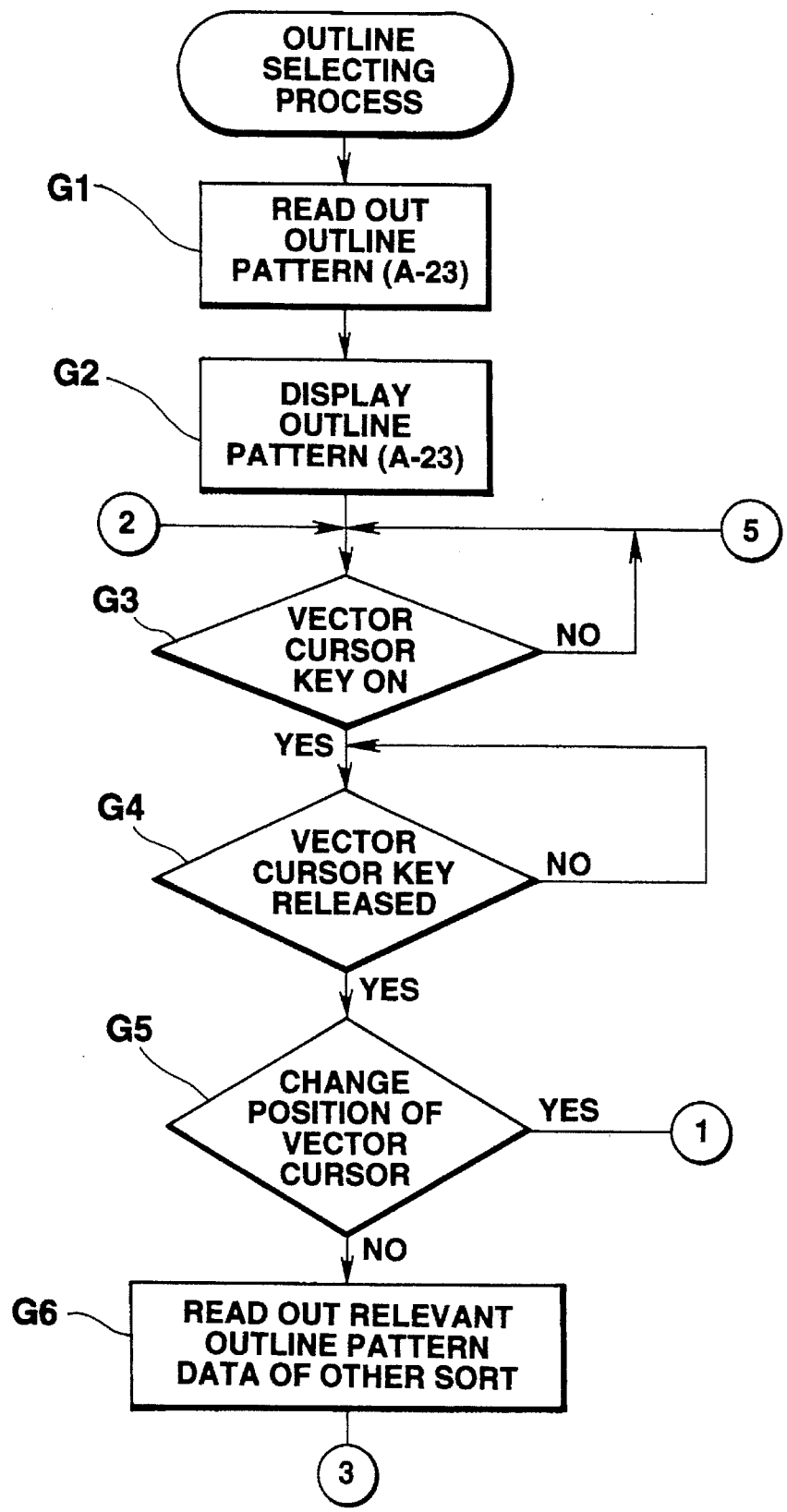
Figure 19:
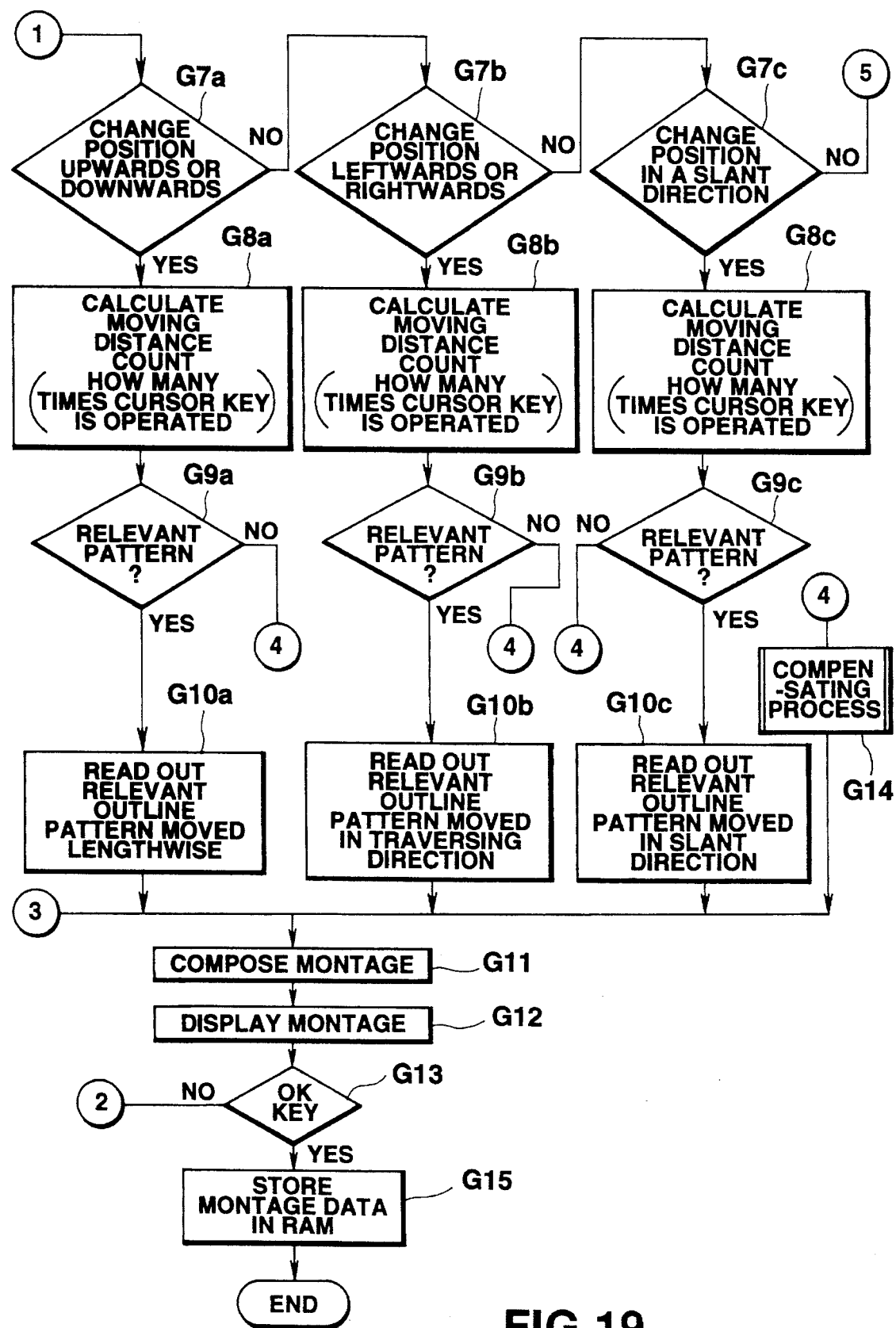
Figure 20:
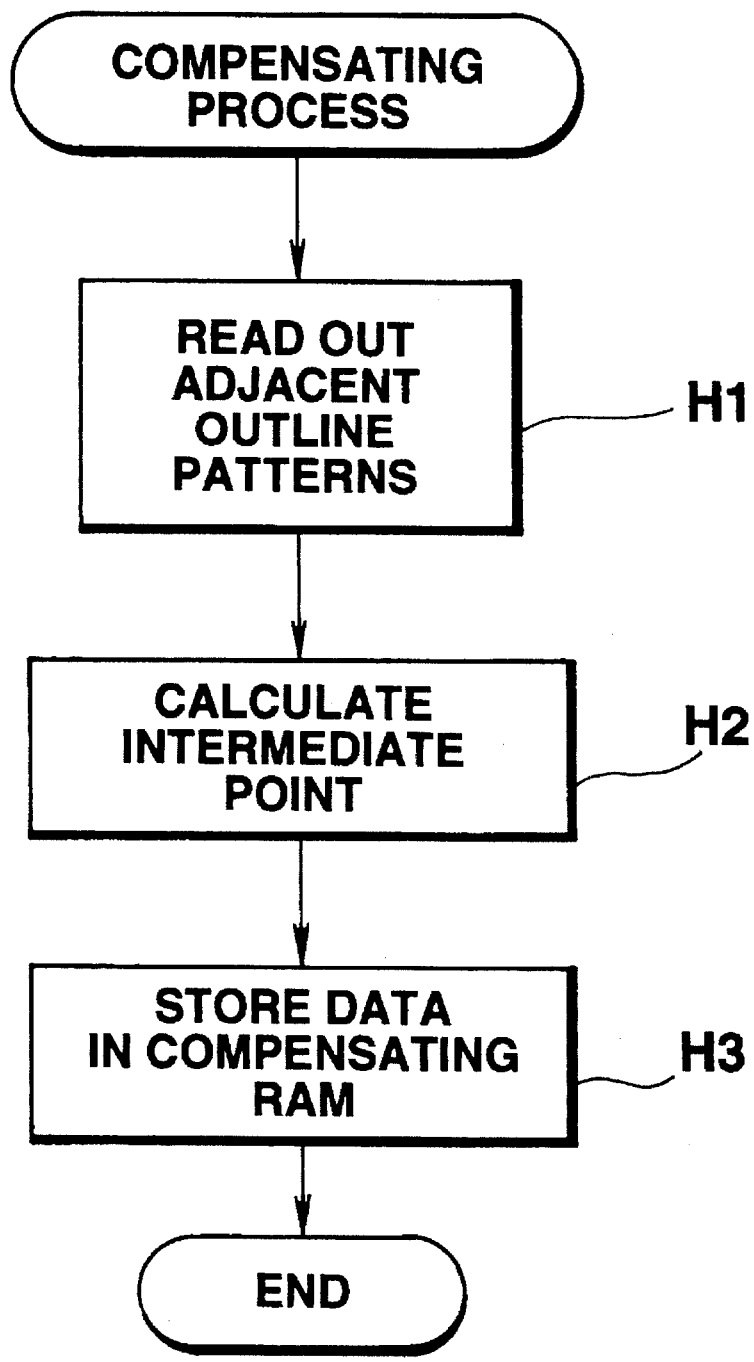

FIG. 18 is a flow chart of the first half of the outline selecting process, and FIG. 19 is a flow chart of the second half of the outline selecting process. FIG. 20 is a flow chart of a compensating process at step G14 of FIG. 19.

Figure 21A:
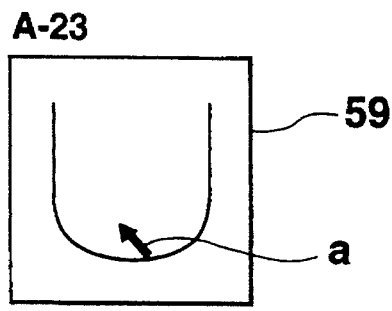
FIGS. 21A to 21E are views showing similar part patterns which are moved on a display unit in a longitudinal direction during the outline selecting process.

At step E1 of FIG. 16, when the CPU 71 is set to the montage composing mode, the outline selecting process starts. The standard part pattern (A-23) of the group (A-group) of outline patterns of the square-jawed face (FIG. 13) is read out from outline pattern areas of the part pattern ROM 73, and is transferred to the composing RAM 76 and is displayed on the display unit 59, as shown in FIG. 21A (steps G1 and G2).

Figure 21B:
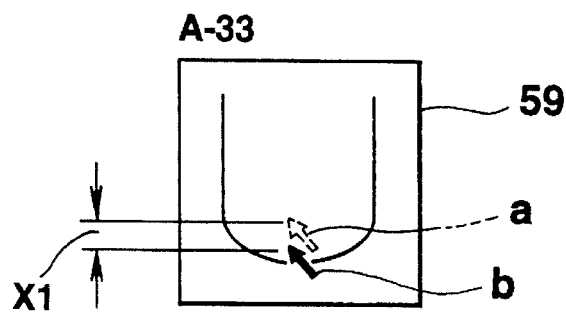

To obtain an outline pattern of a longer face out of the group (A-group) of outline patterns of the square-jawed face as compared with the standard part pattern (A-23) of the square-jawed face, a vector cursor is moved to a position (a-point) on the display unit 59, at which position no part pattern is displayed. Then, the click key 64 of the mouse 63 is held down, the vector cursor is moved downwards by a distance X1 to a position (b-point) as shown in FIG. 21B, and the click key 64 is released (steps G3 and G4).

The CPU 71 detects the on-operation of the click key 64 at the position (a-point) and the release-operation of the click key 64 at the position (b-point), thereby judging whether the vector cursor has been moved on the display unit 59. Determining that the vector cursor has been moved, the CPU 71 further determines that the vector cursor has been moved downwards, and calculates the moving distance X1 (step G5 to steps G7a, G8a).

Based on the direction (downward direction) in which the vector cursor moves in response to the operation of the click key 64 and the distance (X1) along which the vector cursor moves, it is judged at step G9a whether a similar outline pattern that is extended downwards by a length X1 as compared with the standard outline pattern (A-23) has been found among the group (A-group) of outline patterns.

When it is determined at step G9a that the similar outline pattern (in this case, A-33) that is extended downwards by the length X1 as compared with the standard outline pattern (A-23) of the square-jawed face has been found among the group (A-group) of outline patterns, the outline pattern (A-33) of the square-jawed face that is extended downwards is read out and is sent to the composing RAM 76 and is displayed on the display unit 59 (steps G10a, G11, G12).

Figure 21C:
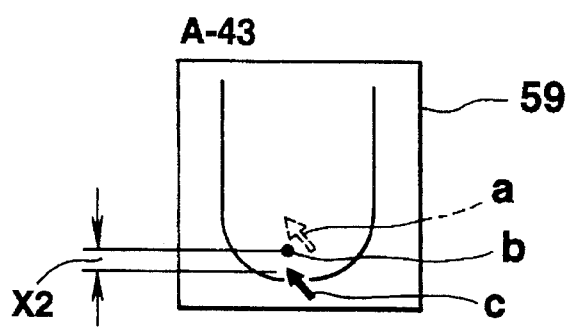

To obtain an outline pattern of a little longer face out of the group (A-group) of outline patterns of the square-jawed face as compared with the outline pattern (A-33) of the square-jawed face displayed on the display unit 59, the click key 64 of the mouse 63 is hold down with the vector cursor located at the point (b-point) on the display unit 59, and the vector cursor is moved downwards by a distance X2 to a point (c-point) as shown in FIG. 21C, and the click key 64 is released (steps G13 to steps G3, G4).

Detecting the on-operation of the click key 64 at the point (b-point) and the release-operation of the click key 64 at the point (c-point), the CPU 71 determines that the vector cursor has been moved and that the vector cursor has been moved downwards, and calculates the moving distance X2 (step G5 to steps G7a, G8a).

Based on the direction (downward direction) in which the vector cursor moves in response to the operation of the click key 64 and the distance (X2) along which the vector cursor moves, it is determined at step G9a that a similar outline pattern (A-43) of the square-jawed face that is extended downwards by a length X2 as compared with the outline pattern (A-33) has been found among the group (A-group) of outline patterns of the square-jawed face. Then, the outline pattern (A-43) of the square-jawed face that is extended downwards is read out and is sent to the composing RAM 76 and is displayed on the display unit 59 (steps G10a, G11, G12).

Figure 21D:
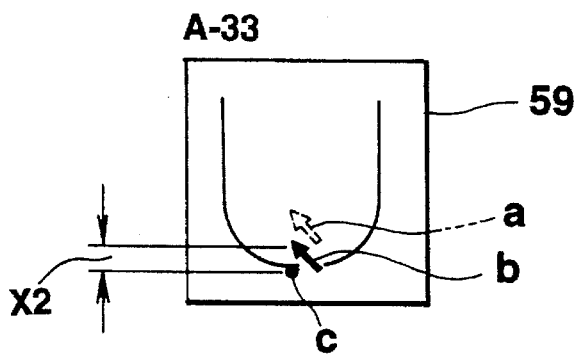
Figure 21E:
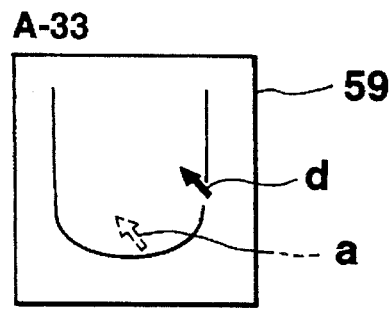

To obtain an outline pattern of a little round face out of the group (A-group) of outline patterns of the square-jawed face as compared with the outline pattern (A-43) of the square-jawed face displayed on the display unit 59, the click key 64 of the mouse 63 is held down with the vector cursor located at the position (c-point) on the display unit 59, and the vector cursor is moved upwards by a desired distance X2 to the position (b-point) as shown in FIG. 21D, and the click key 64 is released (steps G13 to steps G3, G4).

Detecting the on-operation of the click key 64 at the position (c-point) and the release-operation of the click key 64 at the position (b-point), the CPU 71 determines that the vector cursor has been moved and that the vector cursor has been moved upwards, and calculates the moving distance X2 (step G5 to steps G7a, G8a).

Based on the direction (downward direction) in which the vector cursor moves in response to the operation of the click key 64 and the distance (X2) along which the vector cursor moves, it is determined at step G9a that a similar outline pattern (A-33) of the square-jawed face that is contracted by the length X2 as compared with the outline pattern (A-43) of the square-jawed face has been found among the group (A-group) of outline patterns. Then, the outline pattern (A-33) of the square-jawed face that is contracted is read out and is sent to the composing RAM 76 and is displayed on the display unit 59 (step G9a to steps G10a, G11, G12).

It should be noted that even if the vector cursor is moved from a position "a" to a position "d" by operation of the mouse 63, the selected outline pattern (A-33) of the square-jawed face will not be changed to another outline pattern of the square-jawed face when the click key 64 is not kept held down while the vector cursor is being moved.

Figure 22A:
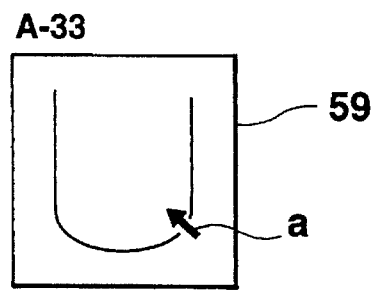
FIGS. 22A and 22B are views showing similar part patterns which are moved on the display unit in a lateral direction during the outline selecting process.
Figure 22B:
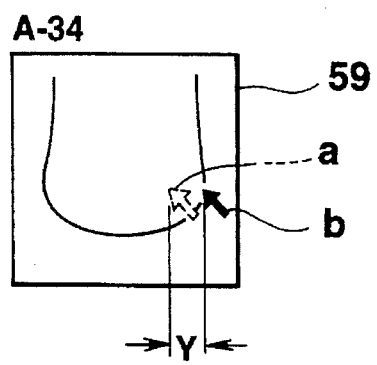

To obtain an outline pattern of a little wider square-jawed face out of the group (A-group) of outline patterns of the square-jawed face as compared with the outline pattern (A-33) of the square-jawed face displayed on the display unit 59, the click key 64 of the mouse 63 is held down with the vector cursor located at the position (a-point) on the display unit 59, and the vector cursor is moved rightwards by a desired distance Y to the position (b-point) as shown in FIG. 22B, and the click key 64 is released (steps G13 to steps G3, G4).

Detecting the on-operation of the click key 64 at the position (a-point) and the release-operation of the click key 64 at the position (b-point), the CPU 71 determines that the vector cursor has been moved rightwards, and calculates the moving distance Y (step G5 to steps G7b, G8b).

Based on the direction (downward direction) in which the vector cursor moves in response to the operation of the click key 64 and the distance (Y) along which the vector cursor moves, it is determined at step G9b that a similar outline pattern (A-34) of the square-jawed face that is wider by a length Y as compared with the outline pattern (A-33) of the square-jawed face has been found among the group (A-group) of outline patterns of the square-jawed face. Then, the outline pattern (A-34) of a little wider square-jawed face is read out and is sent to the composing RAM 76 and is displayed on the display unit 59 (step G9b to steps G10b, G11, G12).

The similar outline pattern (A-34) of the desired long square-jawed face is selected, and the OK key 57 is operated, the part-pattern number A-34 of the above selected outline pattern is stored in the combination data RAM 74 as montage data corresponding to the outline part of the desired montage (step G13 to step G15).

When the vector cursor is moved on the display unit 59 in any direction of the upper right, the upper left, the lower right and the lower left directions, a direction in which the vector cursor travels is determined and a distance along which the vector cursor travels is calculated. Based on the direction in which the vector cursor travels and the calculated distance, a similar outline pattern (A-24, A-22, A-44 or A-42) of a square-jawed face having a face length and a square jaw both of which vary with the distance in the quarter direction is selected from among the group (A-group) of outline patterns of the square-jawed face, and is displayed on the display unit 59 in place of the previously selected outline pattern (for example, A-33) of the square-jawed face (steps G3 to G5, steps G7c to G10c, steps G11, G12).

Figure 23A:
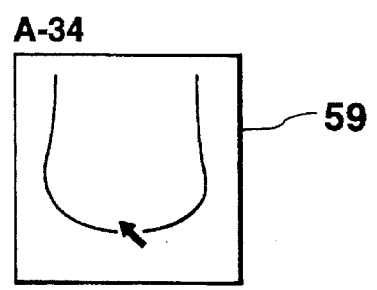
FIGS. 23A to 23C are views showing part patterns which are selected during the outline selecting process.

Meanwhile, for example, when the similar outline pattern (A-34, stored at the area of the part pattern ROM 73 for the first sort of the outline pattern) of the square-jawed face is selected from among the group (A-group) of outline patterns and is displayed on the display unit as shown in FIG. 23A, the click key 64 is operated with the vector cursor kept at one position. Then, a similar outline pattern (B-34, stored at the area of the part pattern ROM 73 for the second sort of outline pattern) of a round-jawed face corresponding to the outline pattern (A-34) of the square-jawed face is selected from among the group (B-group) of outline patterns of the round-jawed face (see FIG. 14) and is displayed on the display unit 59 (steps G3 to G6, steps G11, G12).

Figure 23B:
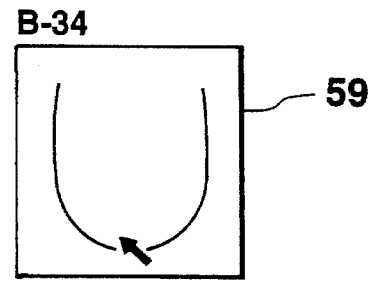
Figure 23C:
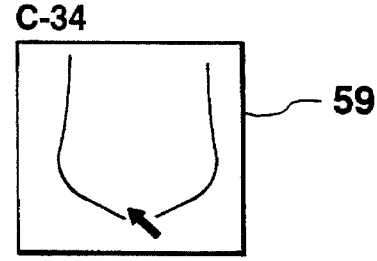
Figure 24:
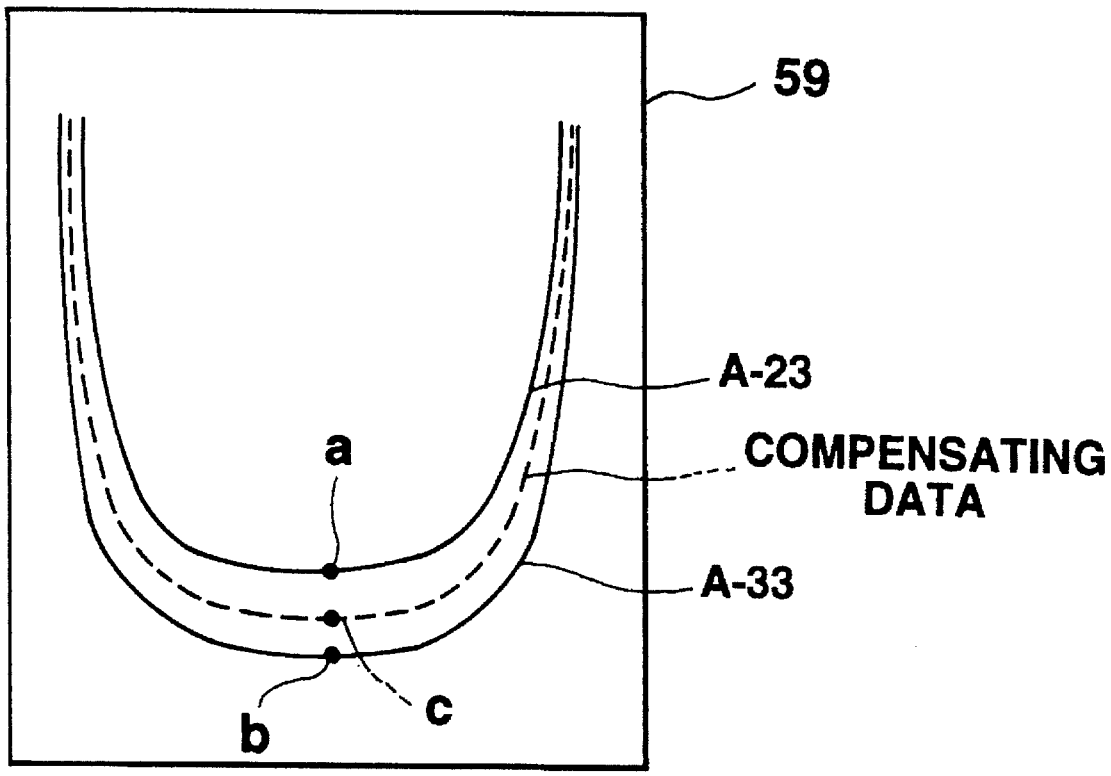

Further, for example, when the similar outline pattern (B-34, stored at the area of the part pattern ROM 73 for the second sort of the outline pattern) of the round-jawed face is selected from among the group (B-group) of outline patterns and is displayed on the display unit as shown in FIG. 23B, the click key 64 is operated with the vector cursor kept at one position. Then, a similar outline pattern (C-34, stored at the area of the part pattern ROM 73 for the third sort of outline pattern) of a sharp-jawed face corresponding to the outline pattern (B-34) of the round-jawed face is selected from among the group (C-group) of outline patterns of the sharp-jawed face (see FIG. 15) and is displayed on the display unit 59 (steps G13 to step G3, steps G11, G12).

To obtain an outline pattern of a little longer face, the vector cursor is moved downwards from the position (a-point) to the position (c-point) on the display unit 59 and further the click key 64 is operated while the standard outline pattern of the group (A-group) of outline patterns is displayed on the display unit 59. But, when a similar outline pattern which corresponds to the direction (downwards) in which the vector cursor is moved and the distance along which the cursor is moved is not found in the group (A-group) of outline patterns, the compensating process is performed on two similar outline patters (A-23) and (A-33) which are selected in accordance with the a-point and the b-point that are adjacent to the c-point in a vertical direction, thereby a new similar outline pattern corresponding to the movement of the vector cursor being obtained (steps G3, to G5, to steps G7a to G9a to step G14).

More specifically, in the compensating process of FIG. 20, two similar patterns (A-23), (A-33) are read out from the part pattern ROM 73 at step H1 of the flow chart of FIG. 20, which patterns are selected with respect to two points, a-point and b-point, that are adjacent to the position (c-point) in the vertical direction. From the coordinates of the two similar outline patterns (A-23), (A-33) on the bit map, the coordinates of the intermediate point between the above two points, a-point and b-point, are calculated. The new similar outline pattern composed in accordance with the calculated coordinates is stored as compensating data in the compensating RAM 75. The new similar outline pattern is transferred to the composing RAM 76 and is displayed on the display unit 59 (steps, H2, H3, G11 and G12).

For example, when, recognizing that the new outline pattern obtained in the compensating process is desired one, the user of the apparatus operates the OK key, an address number which is representative of the new outline pattern stored in the compensating RAM 75 is stored at a memory area of the similar outline patterns in the combination data RAM 74 (steps G13, G15).

When the click key 64 is operated with the vector cursor remaining stationary at a position on the display unit 59, a different group (A-group, B-group and C-group) of outline patterns stored in the part pattern ROM 73 are selected. When the vector cursor is moved on the display unit 59 in any direction of the upper left, the upper right, the lower left and the lower right directions and simultaneously the click key 64 is operated, a similar outline pattern in the same group of outline patterns as that of the outline pattern selected at the present is selected and is changed in accordance with the moving direction of the vector cursor and the moving distance, or a new outline pattern is obtained by the compensating process. As a result, an outline pattern is easily obtained of a long (extended) or contracted face montage or of a square-jawed or hollow-cheeked face montage.

Once a desired outline pattern is composed, and is registered to the combination data RAM 74 as described above, a standard hair style pattern (A-23) of a group (A-group) of hair style patterns is read out from the part pattern ROM 73 and is displayed on the display unit 59. Then, a hair style part selecting process starts in accordance with the moving operation of the vector cursor at step E3 of the flow chart of FIG. 16 in the similar manner as described with respect to the outline pattern.

Similarly, after the above hair style part selecting process, an eye part selecting process of step E4, a nose part selecting process of step E4 and a mouth part selecting process are executed, and the similar pattern selecting process are also executed in accordance with the moving operation of the vector cursor during the respective part selecting processes, thereby a desired face montage is completed and the montage data is registered in the combination data RAM 74.

In the similar pattern selecting process of each of the parts (the outline part, the hair style part, the eye part, the nose part and the mouth part), the eight-direction cursor keys 56a to 56h may be used to move the vector cursor on the display unit 59. In this case, the moving distance of the vector cursor is calculated based on how often the cursor keys 56a to 56h have been operated.

As described above, the third embodiment of the present invention is provided with the part pattern ROM 73 which stores plural sorts of part patterns of each of the parts composing a portrait, and further stores in a table plural groups of similar part patterns corresponding to each of the part patterns. The sort of part patterns of each of the parts is selected, for example, by the operation of the click key 64, and a similar part pattern is selected from among the part pattern of the same sort in accordance with the moving operation of the vector cursor displayed on the display unit 59. Therefore, even though a number of part patterns for each of the parts are stored in the ROM 73, the sort of the part patterns and the similar part pattern can be successively selected. As a result, delicate change in a part pattern can be expressed easily.

In the above embodiment, both a plurality of sorts of part patterns of each of parts are stored in the part pattern ROM 73, and further a plurality of groups of part patterns of a part pattern are stored in a table in the ROM 73. The sort of the part patterns is selected and further a similar part pattern is selected from among a group of part patterns of the same sort is selected, thereby a part pattern which is changed delicately being expressed by a comparatively simple operation. A part pattern which is changed delicately is not selected from among a group of similar part patterns which are previously prepared by a selecting operation, but the part pattern which is displayed on the display unit 59 when the sort of the part pattern is selected may be directly changed to obtain a similar part pattern of the same sort.

Figure 25A:
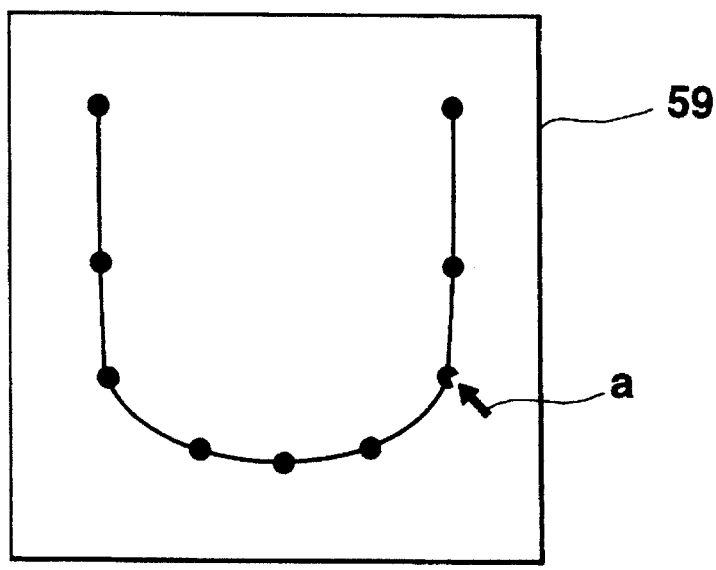
Figure 25B:
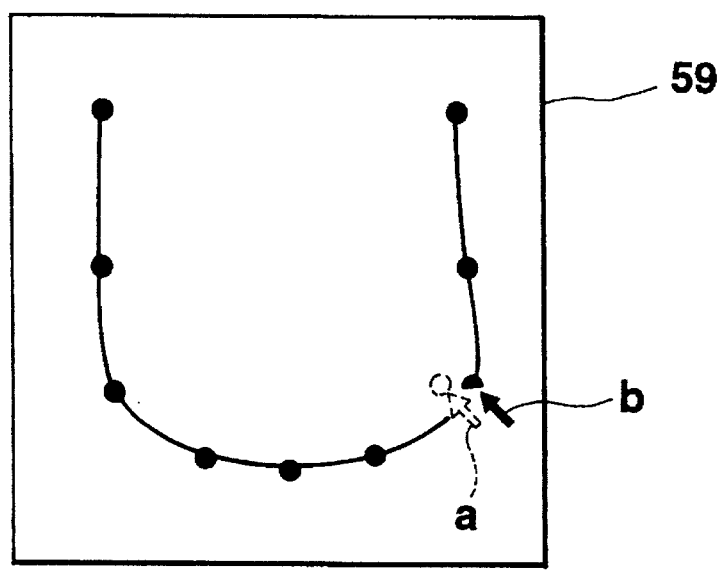

FIGS. 25A and 25B are views illustrating a pattern changing process which is executed when a group of similar part patterns are not prepared for each of part patterns.

For example, when an outline pattern of a sort is selected and displayed in the outline pattern selecting process as shown in FIG. 25A, a pattern dot (a-point) corresponding to a cheek portion to be puffed off of the outline pattern is designated and is dragged to a desired point (b-point) by the vector cursor as shown in FIG. 25B.

By connecting the dot coordinates corresponding to the b-point with a curved pattern line, a partially changed similar outline pattern is obtained.

In the above embodiments, a montage of a human face (a portrait) is composed and displayed, but the embodiments can be applied to animals and other living things such as a spaceman as well as structures and ornaments.

Further in the above embodiments, a liquid crystal dot matrix display unit is used as a display device, on which a composed portrait is displayed. But a printing device may be used in place of the display device to visually output the composed portrait.

Several embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. An image displaying apparatus comprising:

image-data storing means for storing a plurality of image data of each of parts including at least face components comprised of eyes, a nose, a mouth and a face outline, comprising a human face, the image data being different from one another so as to correspond to respective images which are different from each other;

image-data selecting means including:

means for selecting an image data of each of the parts including at least eyes, a nose, a mouth and a face outline, from among the plurality of image data stored in said image-data storing means;

means for storing number data which is representative of the selected image data; and means for changing the stored number data to select other image data;

image composing/storing means for combining the image data selected by said image-data selecting means to compose a face-image data of the human face, and for storing composed face-image data of the human face;

image-data displaying means for displaying the face-image data of the human face stored in said image composing/storing means; and display controlling means for moving at least one of the image data included in the face-image data of the human face on said image-data displaying means.

2. The image displaying apparatus according to claim 1, wherein said display controlling means comprises:

position designating means for designating a position on said image-data displaying means different from the position at which the image data of a part has been displayed; and indication switching means for displaying another image data of the part in place of the previously displayed image data of said part, at the position on said image-data displaying means designated by said position designating means.

3. The image displaying apparatus according to claim 2, wherein said position designating means comprises a mouse switch.

4. An image displaying apparatus comprising:

image-data storing means for storing a plurality of image data of each of parts comprising an object, the image data being different from one another so as to correspond to respective images which are different from each other;

image-data selecting means for selecting an image data of each of the parts from among the plurality of image data stored in said image-data storing means;

image composing/storing means for combining the image data selected by said image-data selecting means to compose an object-image data of the object, and for storing composed object-image data of the object;

image-data displaying means for displaying the object-image data of the object stored in said image composing/storing means; and display control means for moving at least one of the image data included in the object-image data of the object on said image-data displaying means;

wherein said display control means comprises:
    position-data storing means for storing position data which designates a display position on said image-data displaying means where the image data of each of the parts is to be displayed;
    display position control means for displaying the image data of each of the parts at the display position on said image-data displaying means designated by said position data; and
    changing means for changing the position data stored in said position-data storing means.

5. The image displaying apparatus according to claim 4, wherein said changing means includes means for changing the position data stored in said position-data storing means to another position data which designates a display position different from the display position originally designated by said original position data.

6. An image displaying apparatus comprising:

image-data storing means for storing a plurality of image data corresponding to each of face parts which comprise a face, said face parts including at least an outline of the face, eyes, a nose, and a mouth;

image-data selecting means for selecting an image data of each of the face parts from among the plurality of image data stored in said image-data storing means;

image-data displaying means for combining the image data selected by said image-data selecting means to compose an image of the face, and for displaying the composed image of the face; and display controlling means for moving at least one of the image data combined into the composed image of the face displayed on said image-data displaying means; and wherein said display controlling means comprises:
    position-data storing means for storing position data which designates a position on said image-data displaying means where the image data selected by said image data selecting means is to be displayed;
    display position controlling means for displaying the image data combined into the composed image of the face on said image-data displaying means in accordance with the relevant position data stored in said position-data storing means; and
    changing means for changing the position data stored in said position-data storing means to another position data which designates a display position different from the display position originally designated by said original position data.

7. An image displaying apparatus comprising:

image-data storing means for storing a plurality of image data corresponding to each of face parts which comprise a face, said face parts including at least an outline of the face, eyes, a nose, and a mouth;

image-data selecting means for selecting an image data of each of the face parts from among the plurality of image data stored in said image-data storing means;

image-data displaying means for combining the image data selected by said image-data selecting means to compose an image of the face, and for displaying the composed image of the face; and display controlling means for moving at least one of the image data combined into the composed image of the face displayed on said image-data displaying means; and wherein said display controlling means comprises:
    position-data storing means for storing position data which designates a position on said image-data displaying means where the image data selected by said image data selecting means is to be displayed;
    display position controlling means for displaying the image data combined into the composed image of the face on said image-data displaying means in accordance with the relevant position data stored in said position-data storing means;
    a selecting key for selecting a part of the image data which is to be moved on said image-data displaying means;
    a moving key for moving, independently of the other image data, the image data of the part selected by said selecting key on said image-data displaying means; and
    changing means responsive to operation of said moving key for changing the position data of the image data of the part selected by said selecting key stored in said position-data storing means, and for controlling said image-data displaying means to display the image data of the part selected by said selecting key on a position designated by the changed display position data.

8. An image displaying apparatus comprising:

image-data storing means for storing a plurality of image data of each of parts comprising an object, the image data being different from one another so as to correspond to respective images which are different from each other;

image-data selecting means including:
    means for selecting an image data of each of the parts, from among the plurality of image data stored in said image-data storing means;
    means for storing number data which is representative of the selected image data; and
    means for changing the stored number data to select other image data;

image composing/storing means for combining the image data selected by said image-data selecting means to compose an object-image data of the object, and for storing composed object-image data of the object;

image-data displaying means for displaying the object-image data of the object stored in said image composing/storing means; and display controlling means for moving at least one of the image data included in the object-image data of the object on said image-data displaying means, wherein said display control means comprises:
    a selecting key for selecting one of the image data included in the object-image data of the object displayed on said image-data displaying means; and
    moving means for moving the image data selected by said selecting key to display the image data at a position different from the position where the selected imaged data was originally displayed on said image-data displaying means.

* * * * *